United States Patent
Nadeau et al.

(10) Patent No.: US 9,413,634 B2
(45) Date of Patent: Aug. 9, 2016

(54) DYNAMIC END-TO-END NETWORK PATH SETUP ACROSS MULTIPLE NETWORK LAYERS WITH NETWORK SERVICE CHAINING

(71) Applicant: Juniper Networks, Inc., Sunnyvale, CA (US)

(72) Inventors: Thomas D. Nadeau, Hampton, NH (US); Kenneth E. Gray, Myersville, MD (US)

(73) Assignee: Juniper Networks, Inc., Sunnyvale, CA (US)

( * ) Notice: Subject to any disclaimer, the term of this patent is extended or adjusted under 35 U.S.C. 154(b) by 100 days.

(21) Appl. No.: 14/152,942

(22) Filed: Jan. 10, 2014

(65) Prior Publication Data

US 2015/0200838 A1 Jul. 16, 2015

(51) Int. Cl.
*H04L 12/28* (2006.01)
*H04L 12/751* (2013.01)
*H04L 12/721* (2013.01)
(Continued)

(52) U.S. Cl.
CPC ............... *H04L 45/02* (2013.01); *H04B 10/27* (2013.01); *H04L 45/124* (2013.01); *H04L 45/306* (2013.01); *H04L 45/38* (2013.01); *H04L 45/50* (2013.01)

(58) Field of Classification Search
CPC ....... H04L 12/56; H04L 12/24; H04L 47/125; H04L 45/50; H04L 12/803; H04L 12/723; H04L 47/12; H04L 12/28; H04J 3/16; H04J 3/22
USPC ......... 370/389, 390, 392, 396, 397, 399, 400, 370/401, 468, 395.21, 230–232; 709/203, 709/220–226, 227–229
See application file for complete search history.

(56) References Cited

U.S. PATENT DOCUMENTS 6,744,767 B1 * 6/2004 Chiu .................... H04L 12/5693
370/231
7,269,185 B2 9/2007 Kirkby et al.
(Continued)

FOREIGN PATENT DOCUMENTS

WO 2013184846 A1 12/2013

OTHER PUBLICATIONS

Qazi, "SIMPLE-fying Middlebox Policy Enforcement Using SDN," SIGCOMM, Aug. 27, 2013, 12 pp.
(Continued)

*Primary Examiner* — Hanh N Nguyen
(74) *Attorney, Agent, or Firm* — Shumaker & Sieffert, P.A.

(57) ABSTRACT

In general, techniques are described for improving network path computation for requested paths that include a chain of service points that provide network services to traffic flows traversing the requested path through a network along the service chain. In some examples, a controller network device receives a request for network connectivity between a service entry point and a service exit point for a service chain for application to packet flows associated to the service chain. The device, for each pair of the service points in the particular order and using the active topology information, computes at least one end-to-end sub-path through the sub-network connecting the pair of the service points according to a constraint and computes, using the at least one end-to-end sub-path for each pair of the service points, a service path between the service entry point and the service exit point for the service chain.

23 Claims, 10 Drawing Sheets

(51) Int. Cl.
*H04L 12/725* (2013.01)
*H04B 10/27* (2013.01)
*H04L 12/723* (2013.01)

(56) References Cited

U.S. PATENT DOCUMENTS

| | | | |
|---|---|---|---|
| 7,689,120 | B2 | 3/2010 | Hoang et al. |
| 7,990,978 | B1 * | 8/2011 | Chamas et al. .......... 370/395.21 |
| 8,040,808 | B1 | 10/2011 | Kasturi et al. |
| 8,788,640 | B1 * | 7/2014 | Masters ........................ 709/223 |
| 2009/0162060 | A1 | 6/2009 | Vasseur et al. |
| 2009/0304380 | A1 | 12/2009 | Sadananda et al. |
| 2011/0222846 | A1 | 9/2011 | Boertjes et al. |
| 2011/0236013 | A1 | 9/2011 | Gazzola et al. |
| 2013/0011137 | A1 | 1/2013 | Morea et al. |
| 2013/0022352 | A1 | 1/2013 | Yamashita |
| 2014/0003232 | A1 * | 1/2014 | Guichard et al. ............. 370/230 |
| 2014/0044431 | A1 | 2/2014 | Hussain et al. |
| 2014/0169788 | A1 | 6/2014 | Hussain et al. |
| 2014/0192645 | A1 * | 7/2014 | Zhang .................... H04L 47/12 370/235 |
| 2014/0199067 | A1 | 7/2014 | Ahuja et al. |
| 2015/0063802 | A1 | 3/2015 | Bahadur et al. |

OTHER PUBLICATIONS

Bitar, "Interface to the Routing System (I2RS) for Service Chaining: Use Cases and Requirements," Internet Engineering Task Force, I2RS working group, Jul. 15, 2013, 16 pp.

Search Report from counterpart European Application No. 15150698.7-1505, dated May 8, 2015, 7 pp.

Liu et al., "Experimental Demonstration of an OpenFlow/PCE Integrated Control Plane for IP Over Translucent WSON with the Assistance of a Per-Request-Based Dynamic Topology Server," Optical Society of America, Optics Express, vol. 21(4) Feb. 2013, 11 pp.

Liu et al., "Experimental Validation and Performance Evaluation of OpenFlow-Based Wavelength Path Control in Transparent Optical Networks," Optical Society of America, Optics Express, vol. 19(27), Dec. 2011, 30 pp.

Niu et al., "Connection Establishment of Label Switched Paths in IP/MPLS over Optical Networks," Photonic Network Communications, vol. 6(1), Jul. 2003, 9 pp.

Oki et al., "Dynamic Multilayer Routing Schemes in GMPLS-Based IP+Optical Networks," Next Generation Switching and Routing, IEEE Communications Magazine, Jan. 2005, 7 pp.

Atlas et al., "Interface to the Routing System Framework," draft-ward-irs-framework-00, Network Working Group, Internet-draft, Jul. 30, 2012, 21 pp.

Otani, "Generalized Labels for Lambda-Switch-Capable (LSC) Label Switching Routers," IETF RFC 6205, Mar. 2011, 16 pp.

Palmieri, "GMPLS Control Plane Services in the Next-Generation Optical Internet," The Internet Protocol Journal, vol. 11, No. 3, Sep. 2008, pp. 2-18.

Papadimitriou, "Generalized Multi-Protocol Label Switching (GMPLS) Signaling Extensions for G.709 Optical Transport Networks Control," Network Working Group RFC 4328, Jan. 2006, 22 pp.

Valiveti, "OTN Overview," System Architecture Group, Infinera Corp., Mar. 2012, 25 pp.

Vasseur, "Path Computation Element (PCE) Communication Protocol (PCEP)," Network Working Group, Request for Comment 5440, Mar. 2009, 87 pp.

U.S. Appl. No. 13/288,856, filed Nov. 3, 2011, entitled "Topology Determination for an Optical Network."

U.S. Appl. No. 13/324,861, filed Dec. 13, 2011, entitled "Path Computation Element Communication Protocol (PCEP) Extensions for Stateful Label Switched Path Management."

U.S. Appl. No. 13/110,987, filed May 19, 2011 and entitled "Dynamically Generating Application-Layer Traffic Optimization Protocol Maps."

U.S. Appl. No. 14/015,505, filed Aug. 30, 2013 and entitled "Dynamic End-To-End Network Path Setup Across Multiple Network Layers".

Bocci et al., "A Framework for MPLS in Transport Networks," IETF RFC 5291, May 5, 2010, 126 pp.

Response to European Office Action dated Jul. 20, 2015, from counterpart European application No. 15150698.7 filed Jan. 13, 2016, 5 pp.

* cited by examiner

DYNAMIC END-TO-END NETWORK PATH SETUP ACROSS MULTIPLE NETWORK LAYERS WITH NETWORK SERVICE CHAINING

TECHNICAL FIELD

The disclosure relates to computer networks and, more particularly, to forwarding network traffic within computer networks.

BACKGROUND

A computer network is composed of a set of nodes and a set of links that connect one node to another. For instance, a computer network may be composed of a set of routers while the set of links may be cables between the routers. When a first node in the network sends a message to a second node in the network, the message may pass through many links and many nodes. The set of links and nodes that the message passes through while traveling from the first node to the second node is referred to as a path through the network.

Networks contain physical transport elements that are managed and arranged as needed to provide paths for transporting network data. For example, a network may utilize various optical switching components so as to provide an underlying, optical network for transporting network traffic. Once configured, various higher-level network services are transported over the optical paths, such as Internet Protocol (IP), Virtual Private Network (VPN), pseudowires, and others.

As one example, many networks use label switching protocols for traffic engineering the network services provided via the underlying transport elements. In a label switching network, label switching routers (LSRs) use Multi-Protocol Label Switching (MPLS) signaling protocols to establish label switched paths (LSPs), which refer to defined packet flows carried on the underlying physical network elements and the physical paths provided by those elements. The LSRs receive MPLS label mappings from downstream LSRs and advertise MPLS label mappings to upstream LSRs. When an LSR receives traffic in the form of an MPLS packet from an upstream router, it switches the MPLS label according to the information in its forwarding table and forwards the MPLS packet to the appropriate downstream LSR.

Today, the management and arrangement of the physical transport paths (e.g., the optical paths) of a computer network and the traffic engineered flows (e.g., MPLS paths) of the network traffic traversing those physical paths are typically set up and controlled by different network administrative entities using different administrative systems. As a result, in order to set up an MPLS path or other traffic-engineering flow through a network, the IP/MPLS network administrative entity may first need to request the optical transport network administrative entity to provide and allocate network resources for an underlying optical path, which may involve some delay and require additional coordination and resources.

A network operator may deploy one or more network devices to implement service points that apply network services such as firewall, carrier grade network address translation (CG-NAT), performance enhancement proxies for video, transport control protocol (TCP) optimization and header enrichment, caching, and load balancing. In addition, the network operator may configure service chains that each identify a set of the network services to be applied to packet flows mapped to the respective service chains. A service chain, in other words, defines one or more network services to be applied in a particular order to provide a composite service for application to packet flows bound to the service chain.

SUMMARY

In general, techniques are described for improving network path computation for requested paths that include a chain of service points (or "service chain") that provide network services (or network functions) to traffic flows traversing the requested path through a network at least in part along the service chain. For example, a controller that performs path computation may use active topology information for sub-networks that connect pairs of service points in the service chain to compute, according to one or more constraints for the computations, locally optimal paths through the sub-networks connecting the pairs of service points. In some instances, the controller may compute multiple parallel paths connecting any one or more pairs of the service points.

For a given requested path, which may be a virtual flow path and the computation of which may result in installation by the controller to the network of forwarding information to one or more layers of a multi-layer topology, the reservation of the path may be part of a nested set of reservations in which controller first selects and orders the services resources (e.g., the service points)—in some instances by managing non-network constraints on service point device-specific attributes such as device throughput, available/reserved utilization, and provided services and services capability. Requested paths may be responsive to reservations from a customer of the network provider. The techniques may in some instances include combining the reservation and locally optimal service inter-service point path computation to make global network bandwidth reservations to the service way-points part of the path computation constraints. In some instances, the techniques may include performing inter-service point path computation for a requested path using the global network topology and the bandwidth reservation database iteratively after deriving the set of service points from application-specific constraints and/or external policies.

In one example, a method includes receiving, by a controller network device of a network, a request for network connectivity between a service entry point and a service exit point for a service chain that defines one or more service points to be applied in a particular order to provide a composite service for application to packet flows associated to the service chain. The method also includes receiving and storing, by the controller network device, active topology information for the network. The method also includes, for each pair of the service points in the particular order and by the controller using the active topology information, computing at least one end-to-end sub-path through the sub-network connecting the pair of the service points according to a constraint. The method also includes computing, by the controller network device and using the at least one end-to-end sub-path for each pair of the service points, a service path between the service entry point and the service exit point for the service chain.

In another example, a controller network device includes a control unit comprising a processor and configured to receive a request for network connectivity between a service entry point and a service exit point for a service chain that defines one or more service points to be applied in a particular order to provide a composite service for application to packet flows associated to the service chain. The control unit is further configured to receive and store active topology information for the network. The control unit is further configured to, for each pair of the service points in the particular order and using the active topology information, compute at least one end-to-end sub-path through the sub-network connecting the pair of the service points according to a constraint. The control unit is further configured to compute, using the at least one end-to-end sub-path for each pair of the service points, a service path between the service entry point and the service exit point for the service chain. In another example, a non-transitory computer-readable medium stores instructions for causing one or more programmable processors of a controller network device of a network to receive a request for network connectivity between a service entry point and a service exit point for a service chain that defines one or more service points to be applied in a particular order to provide a composite service for application to packet flows associated to the service chain. The instructions further cause the processors to receive and store active topology information for the network. The instructions further cause the processors to, for each pair of the service points in the particular order and using the active topology information, compute at least one end-to-end sub-path through the sub-network connecting the pair of the service points according to a constraint. The instructions further cause the processors to compute, using the at least one end-to-end sub-path for each pair of the service points, a service path between the service entry point and the service exit point for the service chain.

The details of one or more examples are set forth in the accompanying drawings and the description below. Other features, objects, and advantages will be apparent from the description and drawings, and from the claims.

DETAILED DESCRIPTION

In general, techniques are described for dynamic end-to-end network path setup across multiple network layers in a network function virtualization context. For example, a single network element, such as a centralized controller, manages end-to-end network path setup by provisioning a path at both the transport network layer (e.g., optical) and the service network layer (e.g., IP/MPLS) to traverse a service chain of one or more service points that apply network services. The centralized controller performs path computation for a path at both the transport network layer and the service network layer, based on information obtained from the underlying network components at both layers. Moreover, based on the computed path, the controller may automatically initiate allocation of a new physical path, when necessary. Once connectivity is established, the centralized controller further provisions the necessary network elements (e.g., LSRs) to provide the required traffic engineered services, e.g., MPLS.

The techniques of this disclosure may provide one or more advantages. For example, the techniques of this disclosure may provide more efficient use of network and administrative resources. Rather than optical paths being pre-established and potentially only being used much later in time, the techniques of this disclosure allow for dynamic setup of network paths on an as-needed basis. Moreover, the centralized controller can tear down optical paths when not needed, thereby saving energy on lighting the optical path. This may allow for actual optical path usage that more accurately reflects the needs of customer devices.

In this way, the central control may, in some implementations, provide complete control of all aspects of network paths provisioning from a single network element. In addition, a centralized controller that manages multi-layer path construction may offer optimization improvements, such as in terms of path resiliency, resource utilization and fault tolerance (path diversity). The centralized controller described herein automates end-to-end path setup, without necessarily requiring coordination between network administrative entities from two different network domains. The techniques may also allow for a closer binding and association of multi-layer events and failure correlations (e.g., alarms). By using information from multiple layers, it is possible to determine that a failure observed in a higher layer is caused by a failure in the lower layer, and then a service call can be directed to the correct team (e.g., optical vs. MPLS).

Figure 1:
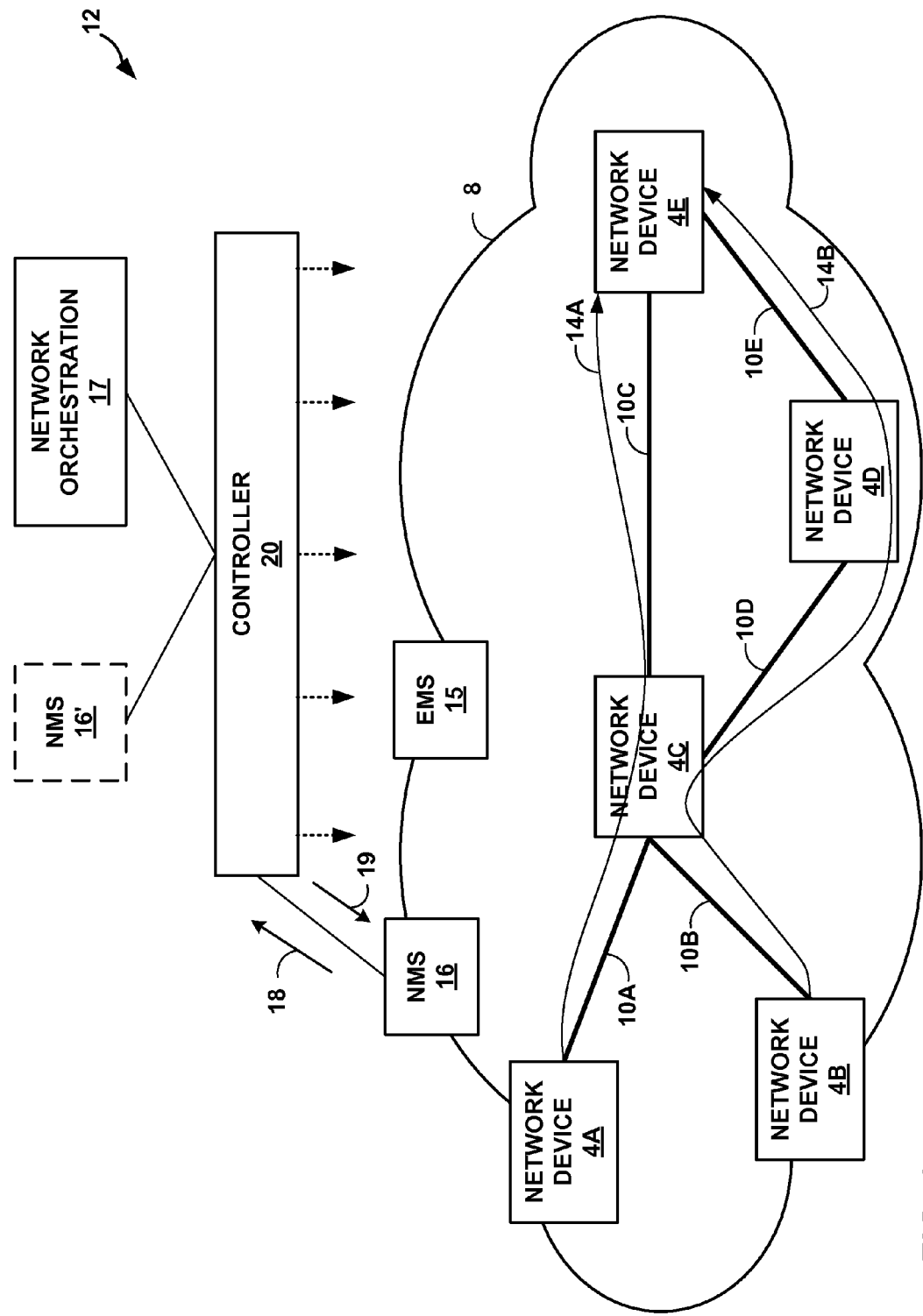
FIG. 1 is a block diagram illustrating an example network in which one or more network devices employ the techniques of this disclosure.

FIG. 1 is a block diagram illustrating an example system 12 in which a network 8 includes one or more network devices that employ the techniques of this disclosure. In this example, network 8 includes network devices 4A-4E ("network devices 4"). Network devices 4 are network devices such as routers, switches, for example. Network 8 also includes optical network components, which in some examples may be part of network devices 4.

Network devices 4 are coupled by a number of physical and logical communication links that interconnect network devices 4 to facilitate control and data communication between network devices 4. Physical links 10A-10E of network 8 may include, for example, optical fibers, Ethernet PHY, Synchronous Optical Networking (SONET)/Synchronous Digital Hierarchy (SDH), Lambda, or other Layer 2 data links that include packet transport capability. The remainder of this description assumes that physical links 10A-10E are optical fibers ("optical fibers 10"). Network 8 also includes one or more logical links 14A-14B such as, for example, pseudowires, an Ethernet Virtual local area network (VLAN), a Multi-Protocol Label Switching (MPLS) Label Switched Path (LSP), or an MPLS traffic-engineered (TE) LSP. The remainder of this description assumes that logical links 14A-14B are MPLS LSPs, and these will be referred to as LSPs 14A-14B ("LSPs 14"). Network system 12 may also include additional components, optical fibers, and communication links that are not shown.

Each of network devices 4 may represent devices, such as routers, switches, repeaters, optical cross-connects (OXCs), optical add-drop multiplexers (OADMs), multiplexing device, or other types of devices, within network 8 that forward network traffic, e.g., optical data. For example, network devices 4 may be layer three (L3) routers optically connected by an intermediate OXC.

In the example of FIG. 1, system 12 may include one or more source devices (not shown) that send network traffic into network 8, e.g., through an access network (not shown), and one or more receiver devices (not shown) that receive the network traffic from network devices 4, e.g., through an access network (not shown). The network traffic may be, for example, video or multimedia traffic. Network 8 may be a service provider network that operates as a private network that provides packet-based network services to receiver devices (not shown), which may be subscriber devices, for example. Receiver devices may be, for example, any of personal computers, laptop computers or other types of computing device associated with subscribers. Subscriber devices may comprise, for example, mobile telephones, laptop or desktop computers having, e.g., a 3G wireless card, wireless-capable netbooks, video game devices, pagers, smart phones, personal data assistants (PDAs) or the like. Subscriber devices may run a variety of software applications, such as word processing and other office support software, web browsing software, software to support voice calls, video games, videoconferencing, and email, among others.

Network management system (NMS) devices 16 and 16' may be computing devices that provides a platform for network management software for managing the devices within network 8. For example, NMS devices 16 and 16' may each comprise a server, a workstation, a personal computer, a laptop computer, a tablet computer, a smartphone, or another type of computing device. Network orchestration device 17 (illustrated as "Network orchestration 17") is a computing device that may participate in establishing a service chain/virtual topology by controlling the various control planes of other devices NMS 16, NMS 16', EMS 15, and controller network device 20, for instance. For example, network orchestration device 17 may facilitate application awareness for application- and/or user-demand responsive path computation and service chain establishment. Network orchestration device 17 may include an Application Programming Interface (API) for policy and network topology/location services, such as Application-Layer Traffic Optimization (ALTO), BGP, and Domain Network Service (DNS), for instance. Network orchestration device 17 may include a Northbound API for applications.

Element management system (EMS) 15 manages network elements of network 8, including network devices 4A-4E and components thereof. The EMS 15 may apply fault, configuration, accounting, performance and security (FCAPS) techniques to monitor and facilitate network element uptime and to coordinate with at least one of NMS 16 and controller 20 to provide network element operations data for use in network path computation and establishing service chains according to techniques herein. The EMS 15 may execute a Northbound interface to NMS 16' and/or network orchestration device 17 and may execute a Southbound interface to network devices 4, for instance. Any of NMS 16, NMS 16', EMS 15, controller 20, network orchestration device 17, and network devices 4 may be executed by a virtual machine executing on a real server or other physical computing device.

Each of network devices 4 may comprise multiple line cards (not shown), also referred to as interface "cards," "boards," or "shelves." The term "line card" may refer to a modular electronic circuit board that provides one or more physical interfaces between a network device and a communications link, such as an optical fiber. Each line card of network devices 4 is associated with one or more ports. Each of the ports provides a physical connection between a network device and an optical fiber. NMS 16 may also include multiple line cards. Each line card of NMS 16 may be associated with one or more ports.

In the simplified example of FIG. 1, optical fiber 10A connects one of the ports of one of the line cards of network device 4A to one of the ports of one of the line cards of network device 4C, for example. Similarly, other optical fibers 10 connect one of the ports of one of the line cards of other network devices 4 to one of the ports of one of the line cards of another one of network devices 4. Thus, network devices 4 and optical fibers 10 form at least part of network 8.

Network devices 4 are configured to output optical signals onto optical fibers 10. In some examples, the optical signals output by network devices 4 have different carrier wavelengths. Network devices 4 may modulate the carrier wavelengths of the optical signals in order to convey data. In some examples, the optical signals may conform to a Synchronous Optical Networking (SONET) protocol or a Synchronous Digital Hierarchy (SDH) protocol.

When network devices 4A and 4B output wavelength-modulated optical signals on optical fibers 10A and 10B, for example, a receiving one of network devices 4 (for example, network device 4C) receives the optical signals. In some aspects, the receiving network device 4C provides a cross-connect that multiplexes optical signals received on optical fibers 10A and 10B into a single multiplexed optical signal that network device 4C outputs on optical fiber 10C, for example. The multiplexed optical signal may include multiple optical signals having different carrier wavelengths. In some examples, network device 4C may receive an optical signal from network device 4A on optical fiber 10A, and network device 4C demultiplexes the optical signal and outputs separate optical signals on optical fibers 10C and 10D.

To provide centralized control of the optical transport network and the IP/MPLS network, controller 20 obtains data indicating an accurate topology of the optical network of service provider network 8, including the particular ports that are used to interconnect the infrastructure devices within the optical network, and controller 20 also obtains data indicating an accurate topology of the IP/MPLS network of service provider network 8, including links, nodes, and LSPs within the IP/MPLS network. In general, controller 20 in conjunction with network orchestration 17 orchestrates various end-to-end solutions across various network devices of FIG. 1. Controller 20 may deliver a feedback loop mechanism between the network and client applications in both directions. Via controller 20, applications can inform devices in network 8 of certain requested aspects such as service-level agreements (SLAs) or guarantees. The controller 20 brings the application and network 8 together so that devices of network 8 can adapt to the needs of the applications, and so that the applications can adapt to the changing network 8. In this manner, controller 20 may provide a mechanism for real-time application-to-network collaboration.

For example, the data indicating the topology of the optical network of service provider network 8 may include data that indicate that network device 4A is physically connected to network device 4C. In another example, the data indicating the topology of optical network may include data that indicate that optical fiber 10E connects a given line card and port of network device 4D to a given line card and port of network device 4E.

Controller 20 can use knowledge of the topology of the optical network when establishing routes through the optical network, diagnosing and remedying problems in the optical network, and for performing other network management tasks. Controller 20 may determine the topology of the optical network in various ways. In some examples, controller 20 may obtain the data indicating topology of the optical network by network devices 4 sending wavelength-modulated optical signals on various ports of the network devices 4. The wavelength-modulated optical signal sent on a given port of the sending device 4 encodes information that identifies the sending device and the given port. If a device receives the modulated optical signal on a given port, the receiving device demodulates the optical signal and outputs a report message to a network management system (NMS). The report message indicates that an optical fiber connects the given port of the receiving device to the given port of the sending device. The NMS may use such messages to generate topology data for the optical network. In other examples, controller 20 may obtain the data indicating topology of the optical network by exchanging, with an NMS, messages having optical pulse patterns that the NMS maps to one or more network devices.

Controller 20 can use knowledge of the topology of the IP/MPLS network when establishing routes through the IP/MPLS network, diagnosing and remedying problems in the IP/MPLS network, and for performing other network management tasks. For example, controller 20 can learn topology of the network using an interior gateway protocol, for example. Details of topology learning are described in further details below.

At the direction of controller 20, or based on local configuration, network devices 4 may establish LSPs 14 along selected paths for concurrently sending network traffic from ingress network devices 4A, 4B, respectively, to egress network device 4E. Network devices 4A, 4B can dynamically recalculate LSPs 14, e.g., responsive to detecting changes to the topology of network 8 or at the direction of controller 20. MPLS LSPs 14 are established as a logical layer over the physical optical transport layer components of network 8. e.g., using an MPLS signaling protocol such as, for example, the Label Distribution Protocol (LDP), Resource ReserVation Protocol with Traffic Engineering extensions (RSVP-TE) (RSVP-TE), Border Gateway Protocol Labeled Unicast (BGP-LU), or other MPLS signaling protocol.

In some aspects, network devices 4 may be IP routers that implement MPLS techniques and operate as label switching routers (LSRs). Each network device 4 makes a forwarding selection and determines a new substitute label by using the label found in the incoming packet as a reference to a label forwarding table that includes this information. The paths taken by packets that traverse the network in this manner are referred to as LSPs.

In some examples, controller 20 receives a connectivity request 18 from the service provider's NMS 16. For example, the connectivity request 18 may request a path from router 4A to router 4E. In some examples, the connectivity request may indicate an amount of bandwidth and/or other constraint for the path, such as latency, packets dropped, color, and so forth. Controller 20 may, in some examples, maintain one or more topology databases that contain information about IP/MPLS links/nodes and/or information about optical links/nodes. Controller 20 determines based on information stored in the topology database if there is already an existing IP/MPLS path between the requested sites that can be reused to accommodate the connectivity request. In some aspects, where an IP/MPLS path already exists, controller 20 may update path reservations of LSP 14A to increase an amount of reserved bandwidth on LSP 14A to accommodate the connectivity request, such as by causing an ingress router 4A to send a new RSVP-TE PATH message along the requested path. Responsive to determining that an IP/MPLS path already exists that can accommodate the connectivity request, controller 20 may indicate to NMS 16 that the connectivity request is granted, such as by sending connectivity confirmation message 19 to NMS 16.

If controller 20 determines that no IP/MPLS path exists between the requested sites, controller 20 may then determine whether an optical path from router 4A to router 4E is already in place, such that an IP/MPLS path can be established over the existing optical network topology. For example, controller 20 may reference a topology database stored locally, or may interact with an external optical topology management device to obtain this information. If an optical path is already in place, controller 20 can signal the desired IP/MPLS path (e.g., LSP 14A) over the existing optical path. Controller 20 may indicate to NMS 16 that the connectivity request is granted, such as by sending connectivity confirmation message 19 to NMS 16.

If an optical path is not already in place, controller 20 may compute an optical path based on stored optical network topology information and program an optical path between the requested sites, such as by using Generalized Multi-Protocol Label Switching (GMPLS) or other mechanism. Alternatively controller 20 may request an external optical topology management device to compute the optical path and program the needed optical path between the requested sites, and the optical topology management device may in turn compute and program the optical path between the requested sites, such as by using GMPLS or other mechanism. After the optical path is programmed, controller 20 can signal the desired IP/MPLS path (e.g., LSP 14A) over the existing optical path. Controller 20 may indicate to the NMS 16 that the connectivity request is granted, such as by sending connectivity confirmation message 19 to NMS 16.

After establishing the LSPs 14, ingress network devices 4A, for example, may receive data traffic from a source device (not shown), and ingress network devices 4A can forward the data traffic along LSP 14A. The data traffic is ultimately received along LSP 14A at network device 4E, and network device 4E may pop (remove) the MPLS label(s) from the received traffic and forward the decapsulated traffic to a receiver device (not shown).

When controller 20 determines there is no need of connectivity between sites, controller 20 can tear down the unused optical paths or optical path-segments. In this manner, controller 20 can dynamically configure both the optical and MPLS paths on an as-need basis.

Figure 2:
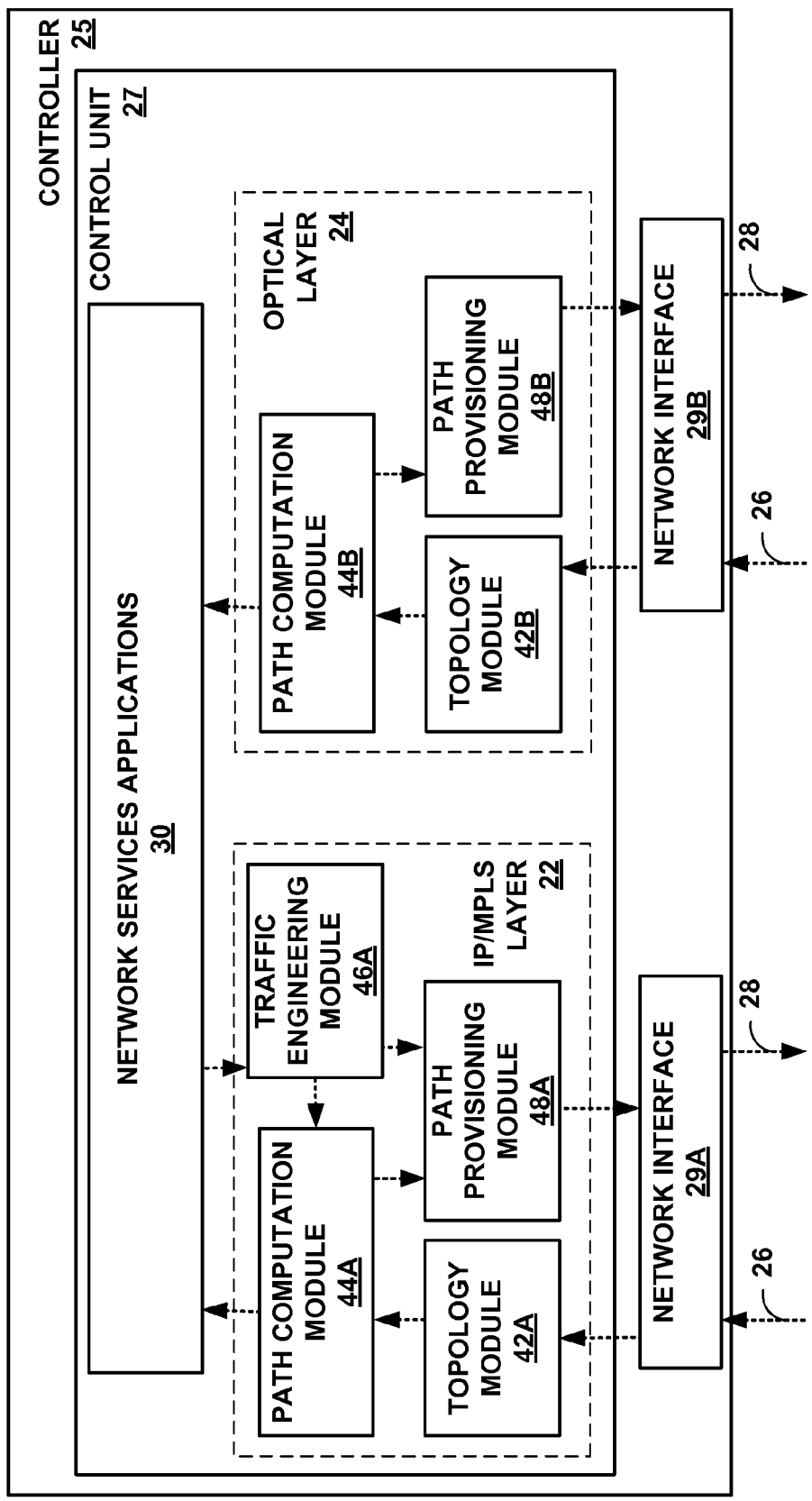
FIG. 2 is a block diagram illustrating an example centralized controller network device that operates in accordance with the techniques of this disclosure.

FIG. 2 is a block diagram illustrating an example controller 25 that operates in accordance with the techniques of this disclosure. Controller 25 may include a server or network controller, for example, and may represent an example instance of controller 20 of FIG. 1.

Controller 25 includes a control unit 27 coupled to network interfaces 29A-29B ("network interfaces 29") to exchange packets with other network devices by inbound links 26 and outbound links 28. Control unit 27 may include one or more processors (not shown in FIG. 2) that execute software instructions, such as those used to define a software or computer program, stored to a computer-readable storage medium (again, not shown in FIG. 2), such as non-transitory computer-readable mediums including a storage device (e.g., a disk drive, or an optical drive) or a memory (such as Flash memory or random access memory (RAM)) or any other type of volatile or non-volatile memory, that stores instructions to cause the one or more processors to perform the techniques described herein. Alternatively or additionally, control unit 27 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 27 provides an operating environment for network services applications 30, IP/MPLS layer element 22, and optical layer element 24. In the example of FIG. 2, IP/MPLS layer element 22 includes topology module 42A, path computation module 44A, traffic engineering module 46A, and path provisioning module 48A. Optical layer element 24 includes topology module 42B, path computation module 44B, and path provisioning module 48B. Although shown as separate modules associated with the separate layers 22, 24, in some examples one or more of path computation modules 44A-44B, topology modules 42A-42B, and path provisioning modules 48A-48B may be a single module shared between IP/MPLS layer element 22 and optical layer element 24. Further, although shown as separated into distinct path computation, path provisioning, topology, and traffic engineering modules, in some examples one or more of these different modules may be combined within a given layer 22, 24 of controller 25.

In some examples, the modules of controller 25 may be implemented as one or more processes executing on one or more virtual machines of one or more servers. That is, while generally illustrated and described as executing on a single controller 25, aspects of these modules may be delegated to other computing devices.

Network services applications 30 may communicate with NMS 16 to receive a connectivity request, such as for setting up connectivity between two locations or network sites. IP/MPLS layer element 22 of controller 25 communicates via network interface 29A to direct network devices 4 to establish one or more of LSPs 14A-14B ("LSPs 14"), or to directly install forwarding state to network devices 4 for LSPs 14. Although primarily described with respect to layer 3/layer 2.5 (e.g., MPLS) path provisioning, IP/MPLS layer element 22 may further direct network devices 4 to manage paths at layer 2 and layer 1 as well. That is, IP/MPLS layer element may control a path at any of layers 1-3 or combination thereof. Optical layer element 24 of controller 25 communicates via network interface 29B to direct program one or more of optical fibers 10.

Network services applications 30 represent one or more processes that provide services to clients of a service provider network that includes controller 25 to manage connectivity in the path computation domain. Network services applications 30 may provide, for instance, include Voice-over-IP (VoIP), Video-on-Demand (VOD), bulk transport, walled/open garden, IP Mobility Subsystem (IMS) and other mobility services, and Internet services to clients of the service provider network. Networks services applications 30 may require services provided by one or both of path computation modules 44A-44B, such as node management, session management, and policy enforcement. Each of network services applications 30 may include a client interface (not shown) by which one or more client applications request services. For example, controller 25 may receive a request such as connectivity request 18 from NMS 16 (FIG. 1) via the client interface, and may send a message such as connectivity confirmation message 19. The client interface may represent a command line interface (CLI) or graphical user interface (GUI), for instance. The client interface may also, or alternatively, provide an application programming interface (API) such as a web service to client applications.

In some examples, network services applications 30 may issue path requests to one or both of path computation modules 44A-44B ("path computation modules 44") of optical layer element 24 and IP/MPLS layer element 22 to request paths in a path computation domain controlled by controller 25. Path computation modules 44 accept path requests from network services applications 30 to establish paths between the endpoints over the path computation domain. In some aspects, path computation modules 44 may reconcile path requests from network services applications 30 to multiplex requested paths onto the path computation domain based on requested path parameters and anticipated network resource availability.

To intelligently compute and establish paths through the IP/MPLS layer path computation domain, IP/MPLS layer element 22 includes topology module 42A to receive topology information describing available resources of the path computation domain, including network devices 4, interfaces thereof, and interconnecting communication links. Similarly, to intelligently compute and establish paths through the optical layer path computation domain, optical layer element 24 includes topology module 42B to receive topology information describing available resources of the path computation domain, including optical components, e.g., network devices 4, and optical fibers 10. In this respect, topology module 42A and topology module 42B dynamically receive active topology information for the domain.

For example, network services applications 30 may receive a path request (e.g., path request 18 from NMS 16, FIG. 1) for a path between network devices 4A and 4E. IP/MPLS layer element 22 and optical layer element 24 of controller 25 may cooperate to service the path request. Topology module 42A may determine whether an IP/MPLS path already exists between network devices 4A and 4E (e.g., an LSP). If not, topology module 42B of optical layer element 24 may determine whether an optical path exists between the requested sites, such that an IP/MPLS path can be established over the existing optical network topology. For example, topology module 42B may access a locally stored topology database to determine whether the necessary optical fibers 10 are turned on and operational on a path between the requested sites.

If an optical path is already in place, path computation module 44A can compute the desired IP/MPLS path and path provisioning module 48 can signal the desired IP/MPLS path (e.g., one of LSPs 14) over the existing optical path. Path computation module 44A of IP/MPLS layer element 22 may compute requested paths through the path computation domain, such as based on stored topology information obtained by topology module 42A. In general, paths are unidirectional. Upon computing paths, path computation module 44A may schedule the paths for provisioning by path provisioning module 48A. A computed path includes path information usable by path provisioning module 48A to establish the path in the network. In some examples, path provisioning module 48A may install MPLS labels and next hops directly in the routing information and/or forwarding plane of network devices 4. In other examples, traffic engineering module 46A may provide an explicit route object (ERO) to an ingress network device 4 and configure the ingress network device 4 to signal a path using the ERO, such as using RSVP-TE. The path computation module 44A computing paths based on traffic engineering constraints, perhaps provided by TE module 46A, and the path provisioning module 48A is converting the path into an ERO (for TE paths) or just labels for direct installation on the network devices 4.

If an optical path is not already in place, path computation module 44B may compute an optical path based on stored optical network topology information obtained from topology module 42B, and path provisioning module 48B can program an optical path between the requested sites, such as by using Generalized Multi-Protocol Label Switching (GM-PLS) or other mechanism. For example, programming the optical path may include path provisioning module 48B instructing components of the optical network along the computed paths to turn on optical signals (e.g., light) on one or more of optical fibers 10, and/or to enable one or more additional different wavelengths on an optical port associated with one of optical fibers 10.

Topology module 42B of optical layer 24 can keep track of resource availability in the optical network system, such as bandwidth, multiplexing capability, ports, shared link risk group (SLRG), and other characteristics of optical network components. Topology module 42B can, in some examples, collect traffic statistics from network elements such as OXCs, and can aggregate and/or analyze the traffic statistics. Path computation module 44B of optical layer 24 may also analyze the traffic statistics to determine whether and how to reconfigure network elements for ensuring that the necessary optical paths are set up. Path provisioning module 48B may make use of wavelength assignment algorithm(s) to select a wavelength for a given light path, either after an optical route has been determined, or in parallel with finding a route.

Path computation module 44B can aid in computing and/or establishing an optical path that meets certain traffic-engineering constraints, and/or connection parameters, such as minimum available bandwidth, SLRG, and the like, as specified by the path request.

Path provisioning module 48B may include GMPLS control plane functions and services, such as connection management and connection restoration, for example. In some aspects, path provisioning module 48B can provide connection creation, modification, status query, and deletion functions in the optical network layer. Path provisioning module 48B can provide information to optical network elements that is used for signaling among corresponding nodes to establish the connection on the computed path. Path provisioning module 48B may, in some examples, output messages containing one or more parameters that the network devices can use to establish a connection that will be used as an optical transport path to transfer data between a source-destination node pair. For example, for establishing such a connection, a light path needs to be established by allocating the same wavelength throughout the route of the transmitted data or selecting the proper wavelength conversion-capable nodes across the path. Light paths can span more than one fiber link and may be entirely optical from end to end, in some examples.

Path requirements 156 represent an interface that receives path requests for paths to be computed by path computation module 44B and provides these path requests (including path requirements) to path engine 162 for computation. Path requirements 156 may be received via northbound API 150. In such instances, a path requirement message may include a path descriptor having an ingress node identifier and egress node identifier for the nodes terminating the specified path, along with request parameters such as Class of Service (CoS) value and bandwidth. A path requirement message may add to or delete from existing path requirements for the specified path. For example, a path requirement message may indicate that a path is needed, that more bandwidth is needed on an existing path, that less bandwidth is needed, or that the path is not needed at all.

In some examples, GMPLS can support traffic engineering by allowing the node at the network ingress to specify the route that a G-LSP will take by using explicit light-path routing. An explicit route is specified by the ingress as a sequence of hops and wavelengths that must be used to reach the egress. In some examples, path provisioning module 48B can send messages to directly configure each optical network component along a light path, whereas in other examples, path provisioning module 48B can send messages to an ingress optical network device to trigger the ingress device to perform the signaling of the light path. For example, in some examples, path provisioning module 48B of optical layer 24 may provide the explicit light-path route, similar to an ERO, to the ingress optical network devices.

In some aspects, path provisioning module 48B can implement protection by establishing one or more pre-signaled backup paths for the optical network connections for fast reroute failure protection, in which case the protection flag may be set.

IP/MPLS layer element 22 and optical layer element 24 of controller 25 can communicate with each other to facilitate the setup and teardown of optical paths and LSPs established over the optical paths in a network. In some examples, path computation module 44B of optical layer element 24 may notify path computation module 44A of IP/MPLS layer element 22 that an optical transport path is in place, and path computation module 44A may in turn proceed with computing and signaling an IP/MPLS path over the underlying optical transport path.

Provisioning a path may require path validation prior to committing the path to provide for packet transport. For example, path provisioning modules 48 may wait to receive a confirmation from each of the relevant network devices 4 that forwarding state for a path has been installed before allowing network traffic to be sent on the path. Upon receiving confirmation from optical layer element 24 and/or IP/MPLS layer element 22 that the requested path is ready for network traffic to be sent on it, network services applications 30 of controller 25 can indicate to the corresponding network service application on NMS 16 that the connectivity request is granted, such as by sending connectivity confirmation message 19.

In addition, when IP/MPLS layer element 22 and/or optical layer element 24 determine there is no longer any need of connectivity between sites, components of IP/MPLS layer element 22 and/or optical layer element 24 can tear down the unused optical paths or optical path-segments over the optical fibers. For example, controller 25 may also receive path withdrawal messages via network services applications 30, and in response, IP/MPLS layer element 22 and/or optical layer element 24 may determine if there are no longer any requestors that are using the path. As another example, topology modules 42A-42B may analyze network traffic statistics on various paths in the IP/MPLS and optical layers, and may determine that network traffic is no longer being sent on one or more paths or optical path segments. In response, path provisioning modules 48 may tear down the paths in the network. "Tearing down" an optical path segment may include instructing components of the optical network to turn off optical signals (light) on one or more of optical fibers 10. In this manner, controller 25 can dynamically configure both the optical and MPLS paths on an as-need basis. Turning off optical fibers 10 when not in use can save energy and associated costs.

Figure 3:
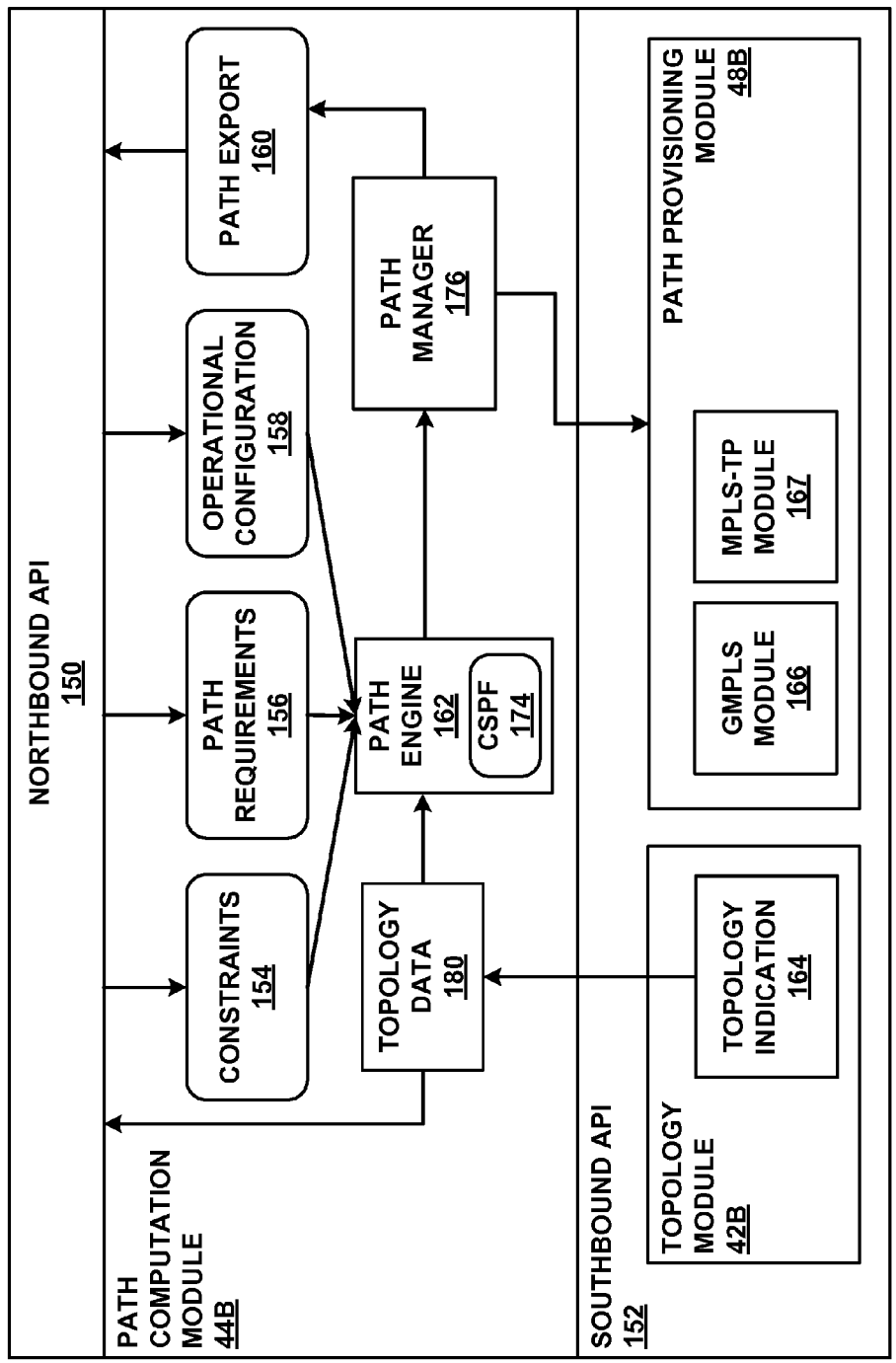
FIG. 3 is a block diagram illustrating an example implementation of optical layer element of a controller.

FIG. 3 is a block diagram illustrating, in detail an example implementation of optical layer element 24 of controller 25 of FIG. 2. In this example, optical layer element 24 includes northbound and southbound interfaces in the form of northbound application programming interface (API) 150 and southbound API 152. Northbound API 150 includes methods and/or accessible data structures by which network services applications 30 may configure and request path computation and query established paths within the path computation domain. Southbound API 152 includes methods and/or accessible data structures by which optical layer element 24 receives topology information for the path computation domain and establishes paths by accessing and programming data planes of aggregation nodes and/or access nodes within the path computation domain.

Path computation module 44B includes data structures to store path information for computing and establishing requested paths. These data structures include constraints 154, path requirements 156, operational configuration 158, and path export 160. Network services applications 30 may invoke northbound API 150 to install/query data from these data structures. Constraints 154 represent a data structure that describes external constraints upon path computation. Constraints 154 allow network services applications 30 to, e.g., modify optical path segment attributes before path computation module 44B computes a set of paths. Network services applications 30 may specify attributes needed in path links and this will effect resulting traffic engineering computations. In such instances, optical path segment attributes may override attributes received from topology indication module 164 and remain in effect for the duration of the node/attendant port in the topology. Operational configuration 158 represents a data structure that provides configuration information to optical layer element 24 to configure the path computation algorithm used by path engine 162.

Path requirements 236 represent an interface that receives path requests for paths to be computed by path computation module 44B and provides these path requests (including path requirements) to path engine 162 for computation. Path requirements 156 may be received via northbound API 150. In such instances, a path requirement message may include a path descriptor having an ingress node identifier and egress node identifier for the nodes terminating the specified path, along with request parameters such as Class of Service (CoS) value and bandwidth. A path requirement message may add to or delete from existing path requirements for the specified path. For example, a path requirement message may indicate that a path is needed, that more bandwidth is needed on an existing path, that less bandwidth is needed, or that the path is not needed at all.

Topology module 42B includes topology indication module 164 to handle topology discovery and, where needed, to maintain control channels between optical layer element 24 and nodes of the path computation domain. Topology indication module 164 may include an interface to describe received topologies to path computation module 44B. In some examples, topology indication module 250 may poll the network devices 4 periodically to determine which components are up and which are down.

In some examples, topology indication module 164 may use a topology discovery protocol to describe the path computation domain topology to path computation module 44B. Topology indication module 164 may, for example, obtain the data indicating topology of the optical network by network devices 4 sending wavelength-modulated optical signals on various ports of the network devices 4. In other examples, topology indication module 164 may obtain the data indicating topology of the optical network by exchanging, with an NMS, messages having optical pulse patterns that the NMS maps to one or more network devices. Examples for determining topology of an optical network are described in U.S. application Ser. No. 13/288,856, filed Nov. 3, 2011, entitled "TOPOLOGY DETERMINATION FOR AN OPTICAL NETWORK," the entire contents of which are incorporated by reference herein.

Topology data 180 stores topology information, received by topology indication module 164, for a network that constitutes a path computation domain for controller 25 to a computer-readable storage medium (not shown). Topology data 180 may include one or more link-state databases (LS-DBs) and/or Traffic Engineering Databases (TEDs), where link and node data is received by manual configuration, in routing protocol advertisements, received from a topology server, and/or discovered by link-layer entities such as an overlay controller and then provided to topology indication module 164. In some instances, an operator may configure traffic engineering or other topology information within topology data 180 via a client interface. Topology data 180 may store the topology information using various formats.

Path engine 162 accepts the current topology snapshot of the path computation domain in the form of topology data 180 and may compute, using topology data 180, CoS-aware traffic-engineered paths between nodes as indicated by configured node-specific policy (constraints 154) and/or through dynamic networking with external modules via APIs. Path engine 162 may further compute detours for all primary paths on a per-CoS basis according to configured failover and capacity requirements (as specified in operational configuration 158 and path requirements 156, respectively).

In general, to compute a requested path, path engine 162 determines based on topology data 180 and all specified constraints whether there exists a path in the layer that satisfies the TE specifications for the requested path for the duration of the requested time. Path engine 162 may use the Djikstra constrained shortest path first (CSPF) 174 path computation algorithms for identifying satisfactory paths though the path computation domain. If there are no TE constraints, path engine 162 may revert to shortest path first (SPF) algorithm. If a satisfactory computed path for the requested path exists, path engine 162 provides a path descriptor for the computed path to path manager 176 to establish the path using path provisioning module 48B. A path computed by path engine 162 may be referred to as a "computed" path, until such time as path provisioning module 48A programs the scheduled path into the network, whereupon the scheduled path becomes an "active" or "committed" path. A scheduled or active path is a temporarily dedicated bandwidth channel for the scheduled time in which the path is, or is to become, operational to transport flows.

Path manager 176 establishes computed scheduled paths using path provisioning module 48B, which in the example of FIG. 3 includes GMPLS module 166 and MPLS Transport Profile module 167 ("MPLS-TP module 167"). In some examples, path manager 176 may select a set of parameters based on the computed optical transport path, and path provisioning module 48B outputs one or more messages containing a set of parameters to establish an optical transport path for the requested network connectivity. GMPLS module 166 and/or MPLS-TP module 167 may program optical components of network devices 4 of the path computation domain in accordance with the parameters. For example, GMPLS module 166 may send messages to network devices 4 using GMPLS to program the optical components, such as by sending instructions to turn on optical signals at one or more wavelengths on optical fibers 10. As another example, MPLS-TP module 167 may send messages to network devices 4 using MPLS Transport Profile to program the optical components, such as by sending instructions to turn on optical signals at one or more wavelengths on optical fibers 10. In some examples, GMPLS module 166 and/or MPLS-TP module 167 may send messages including wavelength labels for signaling an optical path. In other examples, GMPLS module 166 and/or MPLS-TP module 167 may send messages to an ingress network device with information and instructions to allow the ingress network device to signal the optical path. Further details on GMPLS are described in T. Otani, "Generalized Labels for Lambda-Switch-Capable (LSC) Label Switching Routers," IETF RFC 6205, March 2011; and D. Papadimitriou, "Generalized Multi-Protocol Label Switching (GMPLS) Signaling Extensions for G.709 Optical Transport Networks Control," Network Working Group RFC 4328, January 2006, the entire contents of each of which are incorporated by reference herein. Further details on MPLS-TP are described in M. Bocci, Ed., "A Framework for MPLS in Transport Networks," IETF RFC 5921, May, 2010, the contents of which being incorporated by reference in its entirety.

Path provisioning module 48B may in addition, or alternatively, implement other interface types, such as a Simple Network Management Protocol (SNMP) interface, path computation element protocol (PCEP) interface, a Device Management Interface (DMI), a CLI, Interface to the Routing System (I2RS), or any other node configuration interface. In some examples, proprietary mechanisms may be used for optical path configuration. In some examples, GMPLS module 166 establishes communication sessions with network devices 4 to install optical configuration information to receive path setup event information, such as confirmation that received optical configuration information has been successfully installed or that received optical configuration information cannot be installed (indicating optical configuration failure). Additional details regarding PCEP may be found in J. Medved et al., U.S. patent application Ser. No. 13/324,861, "PATH COMPUTATION ELEMENT COMMUNICATION PROTOCOL (PCEP) EXTENSIONS FOR STATEFUL LABEL SWITCHED PATH MANAGEMENT," filed Dec. 13, 2011, and in "Path Computation Element (PCE) Communication Protocol (PCEP)," Network Working Group, Request for Comment 5440, March 2009, the entire contents of each of which being incorporated by reference herein. Additional details regarding I2RS are found in "Interface to the Routing System Framework," Network Working Group, Internet-draft, Jul. 30, 2012, which is incorporated by reference as if fully set forth herein.

In this manner, path provisioning module 48B of controller 25 can output one or more messages to cause an optical transport path to be established or activated to facilitate the requested network connectivity.

Figure 4:
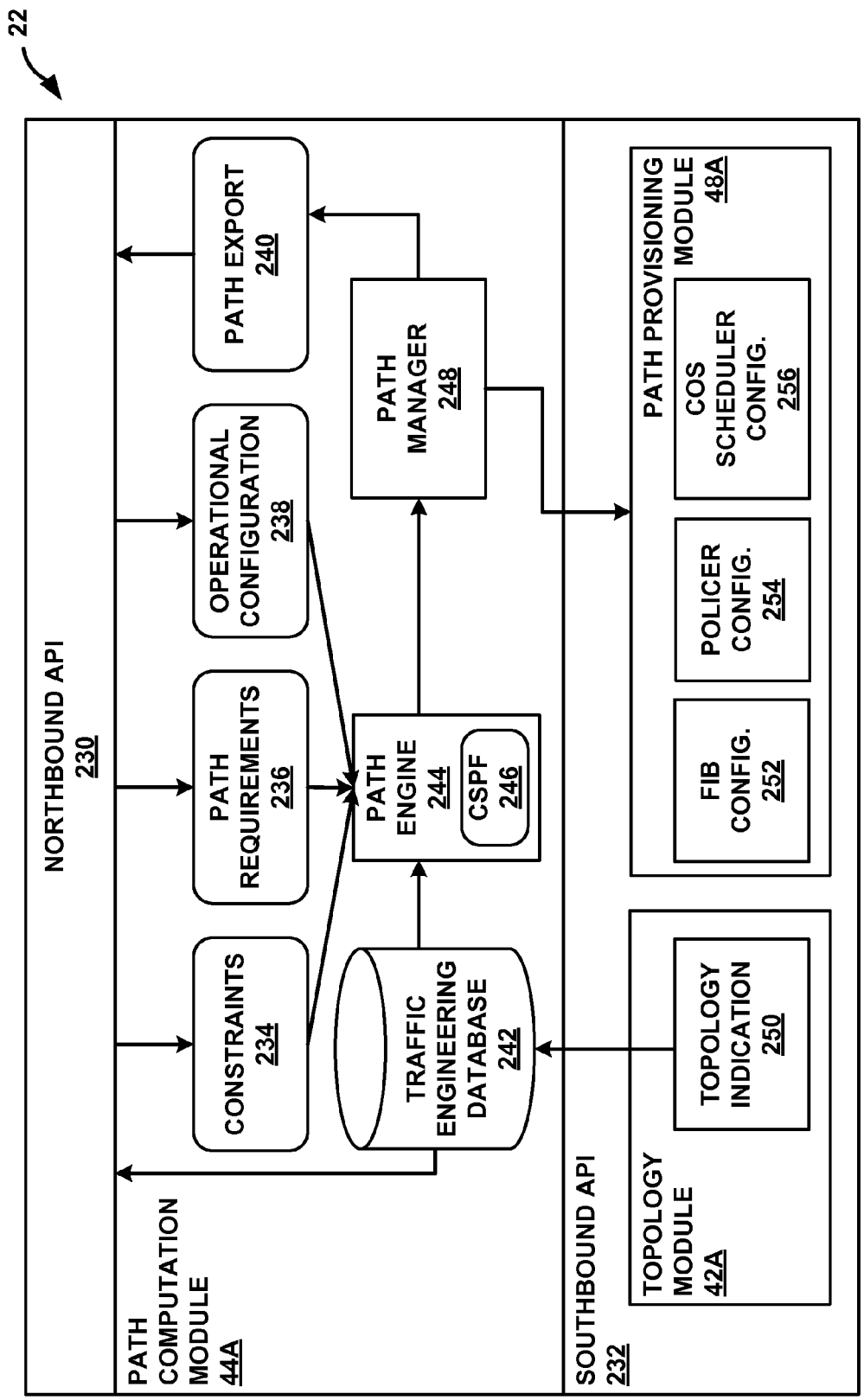
FIG. 4 is a block diagram illustrating an example implementation of IP/MPLS layer element of a controller.

FIG. 4 is a block diagram illustrating, in detail, an example implementation of IP/MPLS layer element 22 of controller 25 of FIG. 2. In this example, path computation element 212 includes northbound and southbound interfaces in the form of northbound application programming interface (API) 230 and southbound API 232. Northbound API 230 includes methods and/or accessible data structures by which network services applications 30 may configure and request path computation and query established paths within the path computation domain. Southbound API 232 includes methods and/or accessible data structures by which IP/MPLS layer 22 receives topology information for the path computation domain and establishes paths by accessing and programming data planes of aggregation nodes and/or access nodes within the path computation domain.

Path computation module 44A includes data structures to store path information for computing and establishing requested paths. These data structures include constraints 234, path requirements 236, operational configuration 238, and path export 240. Network services applications 30 may invoke northbound API 230 to install/query data from these data structures. Constraints 234 represent a data structure that describes external constraints upon path computation. Constraints 234 allow network services applications 30 to, e.g., use links with specific attributes before path computation module 44A computes a set of paths. For examples, Radio Frequency (RF) modules (not shown) may edit links to indicate that resources are shared between a group and resources must be allocated accordingly. Network services applications 30 may specify required attributes of links to effect resulting traffic engineering computations. In such instances, link attributes may override attributes received from topology indication module 250 and remain in effect for the duration of the node/attendant port in the topology. Operational configuration 238 represents a data structure that provides configuration information to path computation element 214 to configure the path computation algorithm used by path engine 244.

Path requirements 236 represent an interface that receives path requests for paths to be computed by path computation module 44A and provides these path requests (including path requirements) to path engine 244 for computation. Path requirements 236 may be received via northbound API 230. In such instances, a path requirement message may include a path descriptor having an ingress node identifier and egress node identifier for the nodes terminating the specified path, along with request parameters such as Class of Service (CoS) value and bandwidth. A path requirement message may add to or delete from existing path requirements for the specified path. For example, a path requirement message may indicate that a path is needed, that more bandwidth is needed on an existing path, that less bandwidth is needed, or that the path is not needed at all.

Topology module 42A includes topology indication module 250 to handle topology discovery and, where needed, to maintain control channels between path computation element 212 and nodes of the path computation domain. Topology indication module 250 may include an interface to describe received topologies to path computation module 44A.

Topology indication module 250 may use a topology discovery protocol to describe the path computation domain topology to path computation module 44A. Topology indication module 250 may communicate with a topology server, such as a routing protocol route reflector, to receive topology information for a network layer of the network. Topology indication module 250 may include a routing protocol process that executes a routing protocol to receive routing protocol advertisements, such as Open Shortest Path First (OSPF) or Intermediate System-to-Intermediate System (IS-IS) link state advertisements (LSAs) or Border Gateway Protocol (BGP) UPDATE messages. Topology indication module 250 may in some instances be a passive listener that neither forwards nor originates routing protocol advertisements. In some instances, topology indication module 250 may alternatively, or additionally, execute a topology discovery mechanism such as an interface for an Application-Layer Traffic Optimization (ALTO) service. Topology indication module 250 may therefore receive a digest of topology information collected by a topology server, e.g., an ALTO server, rather than executing a routing protocol to receive routing protocol advertisements directly. In some examples, topology indication module 250 may poll the network devices 4 periodically to determine which components are up and which are down.

In some examples, topology indication module 250 receives topology information that includes traffic engineering (TE) information. Topology indication module 250 may, for example, execute Intermediate System-to-Intermediate System with TE extensions (IS-IS-TE) or Open Shortest Path First with TE extensions (OSPF-TE) to receive TE information for advertised links. Such TE information includes one or more of the link state, administrative attributes, and metrics such as bandwidth available for use at various LSP priority levels of links connecting routers of the path computation domain. In some instances, indication module 250 executes Border Gateway Protocol for Traffic Engineering (BGP-TE) to receive advertised TE information for inter-autonomous system and other out-of-network links. Additional details regarding executing BGP to receive TE info are found in U.S. patent application Ser. No. 13/110,987, filed May 19, 2011 and entitled "DYNAMICALLY GENERATING APPLICATION-LAYER TRAFFIC OPTIMIZATION PROTOCOL MAPS," which is incorporated herein by reference in its entirety.

Traffic engineering database (TED) 242 stores topology information, received by topology indication module 250, for a network that constitutes a path computation domain for controller 200 to a computer-readable storage medium (not shown). TED 242 may include one or more link-state databases (LSDBs), where link and node data is received by manual configuration, in routing protocol advertisements, received from a topology server, and/or discovered by link-layer entities such as an overlay controller and then provided to topology indication module 250. In some instances, an operator may configure traffic engineering or other topology information within TED 242 via a client interface. TED 242 may store the topology information using various formats.

Path engine 244 accepts the current topology snapshot of the path computation domain in the form of TED 242 and may compute, using TED 242, CoS-aware traffic-engineered paths between nodes as indicated by configured node-specific policy (constraints 234) and/or through dynamic networking with external modules via APIs. Path engine 244 may further compute detours for all primary paths on a per-CoS basis according to configured failover and capacity requirements (as specified in operational configuration 238 and path requirements 236, respectively).

In general, to compute a requested path, path engine 244 determines based on TED 242 and all specified constraints whether there exists a path in the layer that satisfies the TE specifications for the requested path for the duration of the requested time. Path engine 244 may use the Djikstra constrained shortest path first (CSPF) 246 path computation algorithms for identifying satisfactory paths though the path computation domain. If there are no TE constraints, path engine 244 may revert to shortest path first (SPF) algorithm. If a satisfactory computed path for the requested path exists, path engine 244 provides a path descriptor for the computed path to path manager 248 to establish the path using path provisioning module 48A. A path computed by path engine 244 may be referred to as a "computed" path, until such time as path provisioning module 48A programs the scheduled path into the network, whereupon the scheduled path becomes an "active" or "committed" path. A scheduled or active path is a temporarily dedicated bandwidth channel for the scheduled time in which the path is, or is to become, operational to transport flows.

Path manager 248 establishes computed scheduled paths using path provisioning module 48A, which in the example of FIG. 4 includes forwarding information base (FIB) configuration module 252 (illustrated as "FIB CONFIG. 252"), policer configuration module 254 (illustrated as "POLICER CONFIG. 254"), and CoS scheduler configuration module 256 (illustrated as "COS SCHEDULER CONFIG. 256"). Path manager may select a set of parameters based on the computed optical transport path. In some examples, path provisioning module 48A outputs one or more messages containing the set of parameters to establish a traffic-engineered service path for the requested network connectivity, wherein the service path is established to send network traffic over the previously established optical transport path.

FIB configuration module 252 programs forwarding information to data planes of network devices 4 of the path computation domain. The FIB of network devices 4 includes the MPLS switching table, the detour path for each primary LSP, the CoS scheduler per-interface and policers at LSP ingress. FIB configuration module 252 may implement, for instance, a software-defined networking (SDN) protocol such as the OpenFlow protocol to provide and direct the nodes to install forwarding information to their respective data planes. Accordingly, the "FIB" may refer to forwarding tables in the form of, for instance, one or more OpenFlow flow tables each comprising one or more flow table entries that specify handling of matching packets. IP/MPLS layer element 22 or a computing device that operates IP/MPLS layer element 22 may include a Routing Information Base (RIB) that is resolved to generate a FIB for FIB configuration module 252. The RIB and FIB may store routing/forwarding information in one of various formats (NLRI, radix trees, etc.).

FIB configuration module 252 may in addition, or alternatively, implement other interface types, such as a Simple Network Management Protocol (SNMP) interface, path computation element protocol (PCEP) interface, a Device Management Interface (DMI), a CLI, Interface to the Routing System (I2RS), or any other node configuration interface. FIB configuration module interface 62 establishes communication sessions with network devices 4 to install forwarding information to receive path setup event information, such as confirmation that received forwarding information has been successfully installed or that received forwarding information cannot be installed (indicating FIB configuration failure). Additional details regarding PCEP may be found in J. Medved et al., U.S. patent application Ser. No. 13/324,861, "PATH COMPUTATION ELEMENT COMMUNICATION PROTOCOL (PCEP) EXTENSIONS FOR STATEFUL LABEL SWITCHED PATH MANAGEMENT," filed Dec. 13, 2011, and in "Path Computation Element (PCE) Communication Protocol (PCEP)," Network Working Group, Request for Comment 5440, March 2009, the entire contents of each of which being incorporated by reference herein. Additional details regarding I2RS are found in "Interface to the Routing System Framework," Network Working Group, Internet-draft, Jul. 30, 2012, which is incorporated by reference as if fully set forth herein.

FIB configuration module 252 may add, change (i.e., implicit add), or delete forwarding table entries in accordance with information received from path computation module 44A. In some examples, a FIB configuration message from path computation module 44A to FIB configuration module 252 may specify an event type (add or delete); a node identifier; a path identifier; one or more forwarding table entries each including an ingress port index, ingress label, egress port index, and egress label; and a detour path specifying a path identifier and CoS mode.

In this manner, path provisioning module 48A of controller 25 can output one or more messages to cause a service path for the requested network connectivity to be established, wherein the service path is established so as to send network traffic over the optical transport path.

In some examples, policer configuration module 254 may be invoked by path computation module 214 to request a policer be installed on a particular aggregation node or access node for a particular LSP ingress. As noted above, the FIBs for aggregation nodes or access nodes include policers at LSP ingress. Policer configuration module 254 may receive policer configuration requests. A policer configuration request message may specify an event type (add, change, or delete); a node identifier; an LSP identifier; and, for each class of service, a list of policer information including CoS value, maximum bandwidth, burst, and drop/remark. FIB configuration module 252 configures the policers in accordance with the policer configuration requests.

In some examples, CoS scheduler configuration module 256 may be invoked by path computation module 214 to request configuration of CoS scheduler on the aggregation nodes or access nodes. CoS scheduler configuration module 256 may receive the CoS scheduler configuration information. A scheduling configuration request message may specify an event type (change); a node identifier; a port identity value (port index); and configuration information specifying bandwidth, queue depth, and scheduling discipline, for instance.

Figure 5:
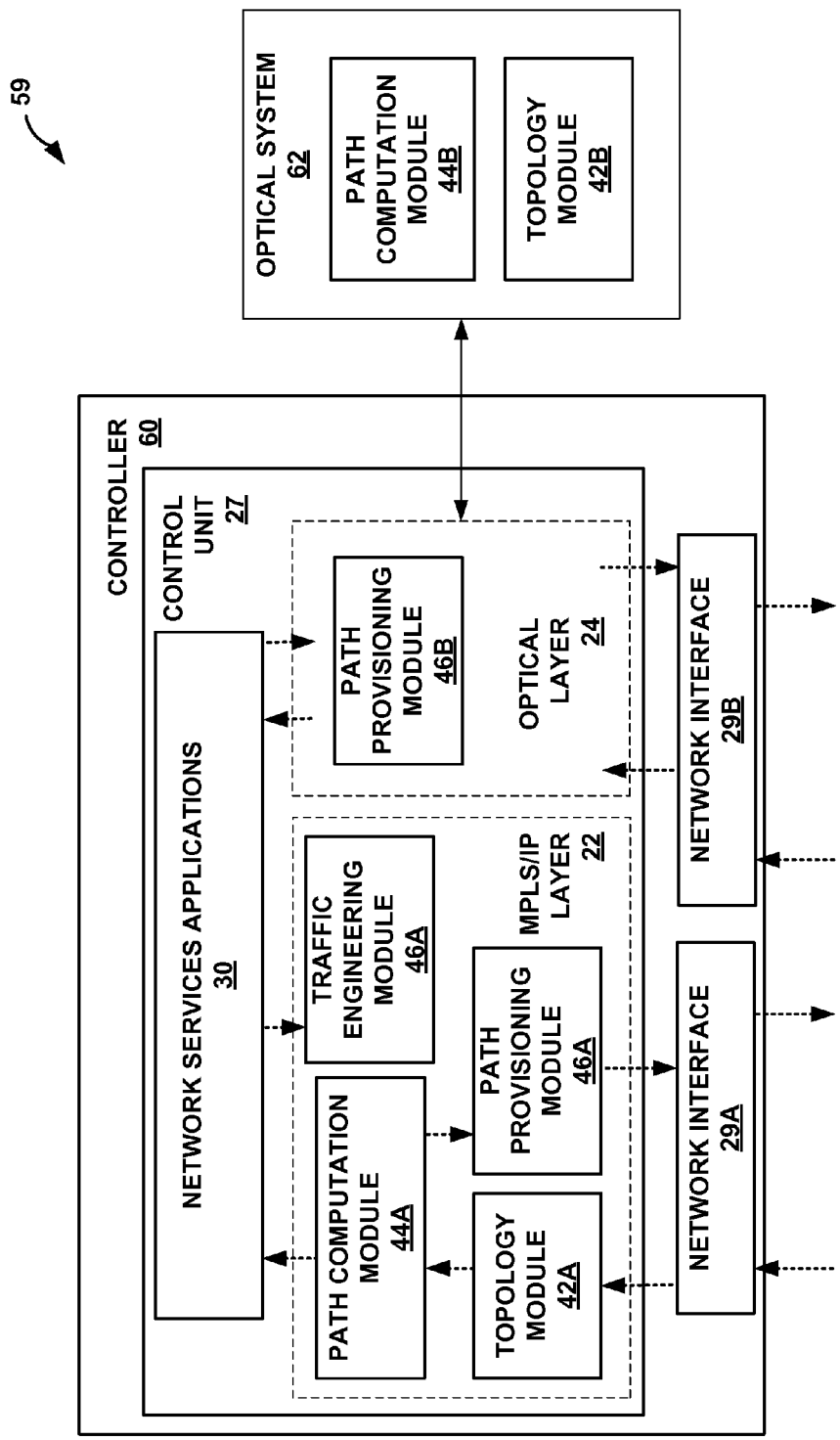
FIG. 5 is a block diagram illustrating an example system having a controller and a separate optical system that operate in accordance with the techniques of this disclosure.

FIG. 5 is a block diagram illustrating an example system 59 that includes a controller 60 and a separate optical system 62 that operate in accordance with the techniques of this disclosure. Controller 60 may include a server or network controller, for example, and may represent an example instance of controller 20 of FIG. 1. Controller 60 may be similar to controller 25 of FIG. 2, except that some parts of the optical layer reside a separate optical system 62. Optical system 62 is an external optical topology management device separate from controller 60, and may be located at a remote location relative to controller 60, for example. In the example of FIG. 3, controller 60 may request optical system 62 to compute the optical path and program the needed optical path between the requested sites, and the optical topology management device may in turn compute and program the optical path between the requested sites, such as by using GMPLS or other mechanism, such as I2RS, manual topology or inventory.

Figure 6:
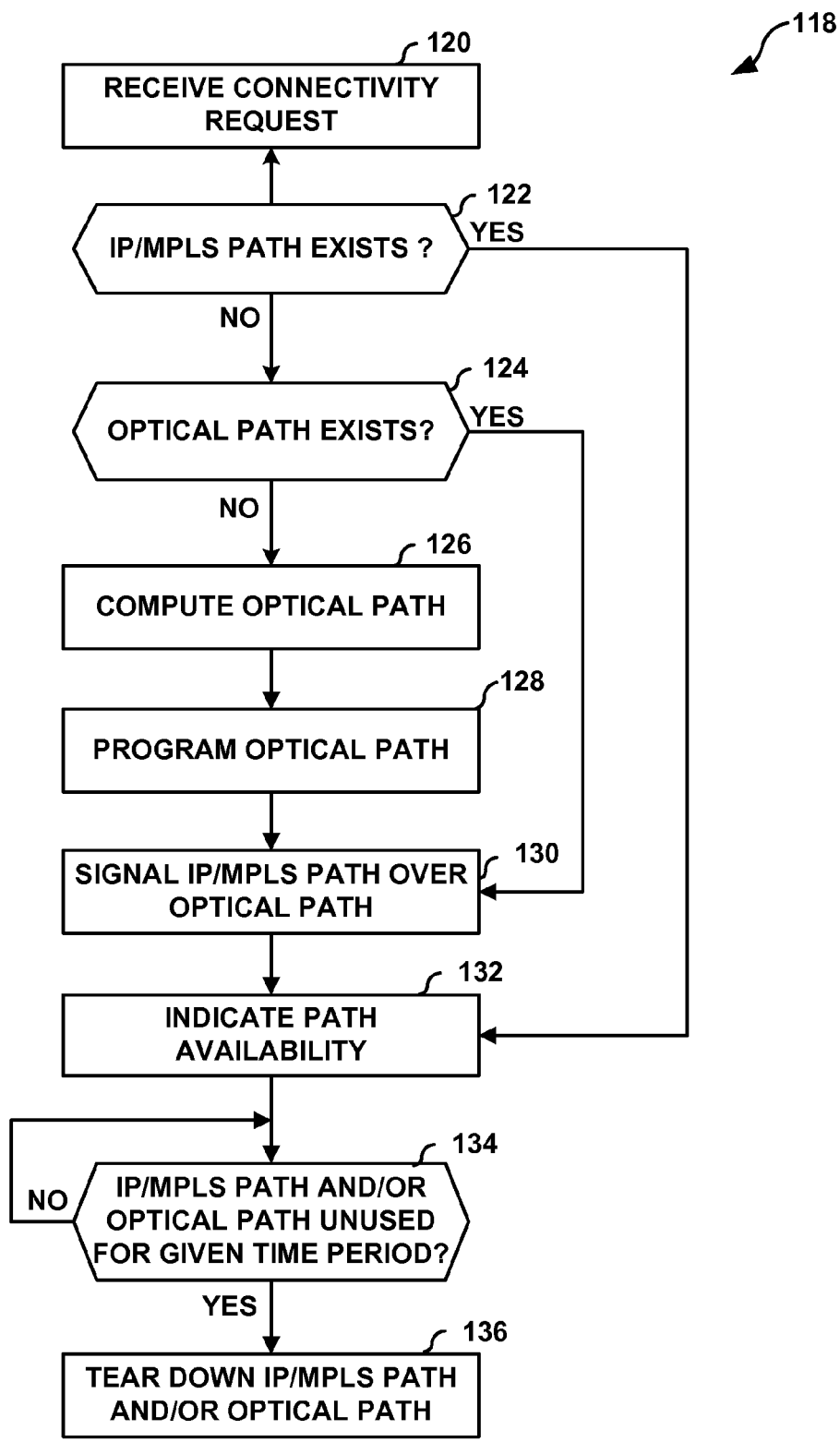
FIG. 6 is a flowchart illustrating exemplary operation of one or more network devices in accordance with the techniques of this disclosure.

FIG. 6 is a flowchart illustrating an example operation 118 of one or more network devices in accordance with the techniques of this disclosure. For purposes of example, operation 118 will be explained with reference to FIG. 1 and may represent an algorithm executed by controller 20.

Controller 20 receives a connectivity request 18 from the service provider's NMS 16 (120). For example, the connectivity request 18 may request a path from router 4A to router 4E. Controller 20 may, in some examples, maintain one or more topology databases that contain information about IP/MPLS links/nodes and/or information about optical links/nodes. Controller 20 determines based on information stored in the topology database if there is already an existing IP/MPLS path between the requested sites that can be reused to accommodate the connectivity request (122). In some aspects, where an IP/MPLS path already exists (e.g., LSP 14A of FIG. 1), controller 20 may update path reservations of LSP 14A to increase an amount of reserved bandwidth on LSP 14A to accommodate the connectivity request, such as by causing an ingress router 4A to send a new RSVP-TE PATH message along the requested path. Responsive to determining that an IP/MPLS path already exists that can accommodate the connectivity request (YES branch of 122), controller 20 may indicate to NMS 16 that the connectivity request is granted (132), such as by sending connectivity confirmation message 19.

If controller 20 determines that no IP/MPLS path exists between the requested sites (NO branch of 122), controller 20 may then determine whether an optical path from router 4A to router 4E is already in place (124), such that an IP/MPLS path can be established over the existing optical network topology. For example, controller 20 may reference a topology database stored locally, or may interact with an external optical topology management device to obtain this information. If an optical path is already in place (YES branch of 124), controller 20 can signal the desired IP/MPLS path (e.g., LSP 14A) over the existing optical path (130). Controller 20 may indicate to NMS 16 that the connectivity request is granted (132), such as by sending connectivity confirmation message 19.

If an optical path is not already in place (NO branch of 124), controller 20 may compute an optical path based on stored optical network topology information (126) and program an optical path between the requested sites (128), such as by using Generalized Multi-Protocol Label Switching (GMPLS) or other mechanism. Alternatively controller 20 may request an external optical topology management device to compute the optical path and program the needed optical path between the requested sites, and the optical topology management device may in turn compute and program the optical path between the requested sites, such as by using GMPLS or other mechanism. After the optical path is programmed, controller 20 can signal the desired IP/MPLS path (e.g., LSP 14A) over the existing optical path (130). Controller 20 may indicate to the NMS 16 that the connectivity request is granted (132), such as by sending connectivity confirmation message 19.

When controller 20 determines there is no need of connectivity between sites (134), controller 20 can tear down the unused optical paths or optical path-segments (136). In this manner, controller 20 can dynamically configure both the optical and MPLS paths on an as-needed basis.

Although illustrated and described in FIG. 6 with respect to an IP/MPLS over optical path setup, the techniques are similarly applicable to Layer 2 (e.g., Ethernet) path setup. The techniques may be applicable to path setup over any combination of multiple layers 1-3, and also including tunneled layers, e.g., layer 2 over layer 3 or layer 2 over layer 2.

Figure 7:
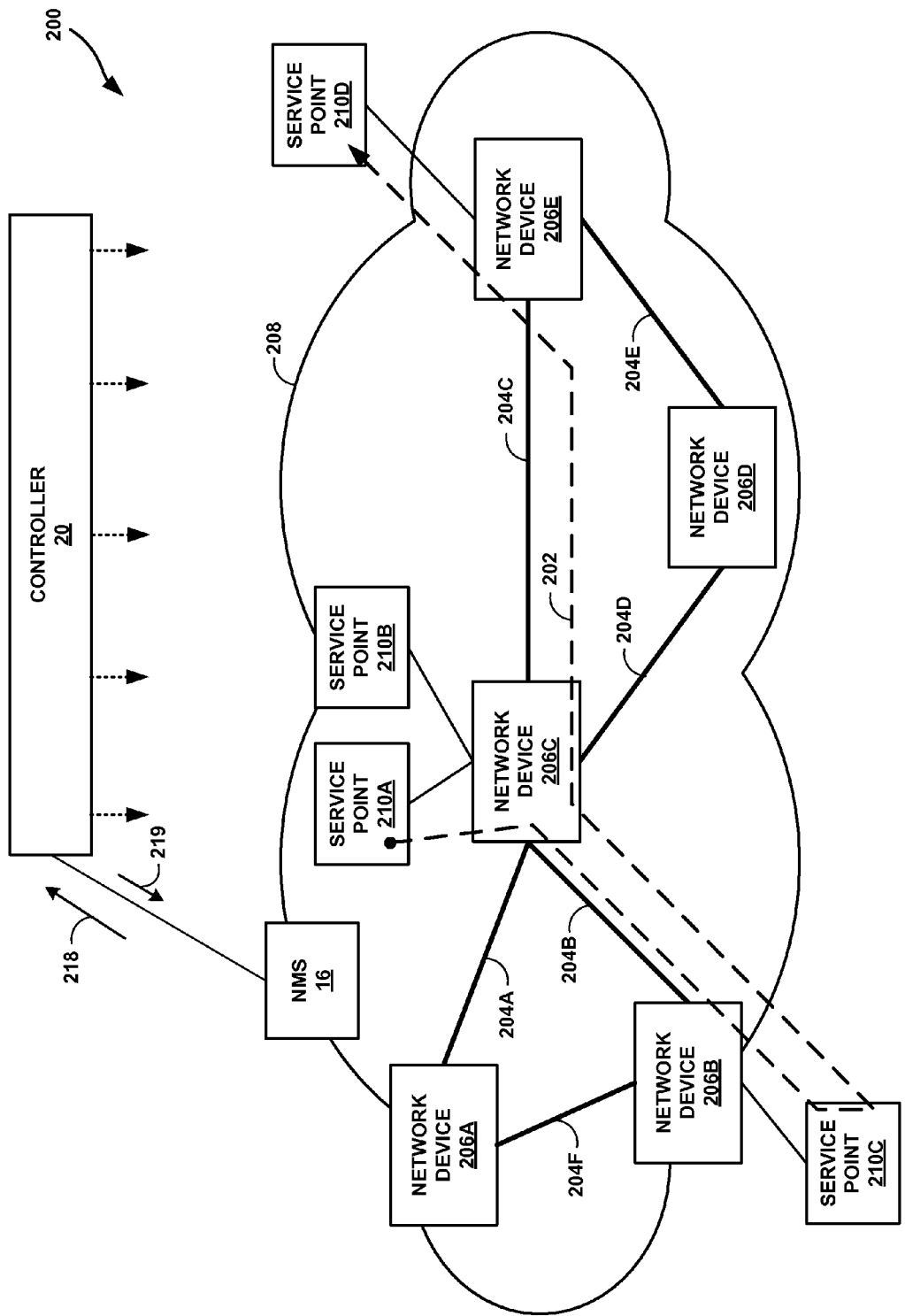
FIG. 7 is a block diagram illustrating an example system in which a network includes one or more network devices that employ techniques described herein.

FIG. 7 is a block diagram illustrating an example system 200 in which a network 208 includes one or more network devices that employ techniques described herein. In this example, network 208 includes network devices 206A-206E ("network devices 206"). Network 8, network devices 206, controller 20, NMS 16, and links 204 may be similar to network 8, network devices 4, controller 20, NMS 16, and links 10, respectively, of FIG. 1.

Network 208 additionally includes service points 210A-210D ("service points 210"). Service points 210 each have a capability to apply one or more value-added services such as firewall, carrier grade network address translation (CG-NAT), media optimization, IPSec/VPN, subscriber management, deep packet inspection (DPI), and load balancing of packet flows. Each of service points 210 in this way represents a service point instance. Service points 210 may represent separate appliances (e.g., firewall appliance, VPN appliance, and so forth) or servers, components or modules of a single appliance or server, virtual machines executed by one or more servers, or any combination of the above. Service points 210 may be devices managed as part of a value-added services complex 9, which may represent a data center. Service points 210 may also, in some instances, be coupled by one or more switches or virtual switches of a core network, may in some instances be inline for packet flows from a gateway of network 208, or any combination of the above. Service points 210 may represent virtual machines orchestrated by controller 20 or a service delivery controller that implements service chains by sequentially directing packets to the service points 210 according to the orderings specified by the service chains. Each of service points 210 may be associated with an IP address by which the service point is addressable to direct network traffic. In some instances, one or more of service points 210 may be routers, servers, or appliances configured within the network 208 topology. Service points may in some examples alternatively be referred to as "service nodes," "value-added service (VAS) points" or nodes, "network function virtualization (NFV) nodes."

Controller 20 may map packet flows to various service chains that represent an ordered set of service points 210. In the illustrated example, a service chain traverses service points 210A, 210C, and 210D in order. Accordingly, packet flows processed according to the service chain follow a service path 202 that traverses service point 210A, 210C, and finally service point 210D as the terminal node for the service chain. Any of service points 210 may support multiple service chains. Whereas a "service chain" defines one or more services to be applied in a particular order to provide a composite service for application to packet flows bound to the service chain, a "service tunnel" or "service path" refers to a logical and/or physical path taken by packet flows processed by a service chain along with the forwarding state for forwarding packet flows according to the service chain ordering. A service chain may have multiple possible service paths. The arrows denoted as service path 202 illustrate a path computed by controller 20 and taken by packet flows mapped to the corresponding service chain.

Each service chain includes a service entry point and service exit point. In the illustrated example, service point 210A include the service entry point and service point 210D includes the service exit point. In some examples, controller 20 receives a connectivity request 218 from the service provider's NMS 16. For example, the connectivity request 218 may request a path for the service chain or alternatively, a list of services controller 20 may use to compute the service chain. In some examples, the connectivity request may indicate an amount of bandwidth and/or other constraints for the path.

In accordance with techniques described herein, controller 20 obtains an active topology for network 208 and computes service path 202 for the service chain using the active topology and constraints using constrained SPF. More specifically, controller 20 computes one or more paths between the service entry and exit points, starting at service point 210A and ending at service point 210, conforming to any path constraints and based on the active topology for network 208 obtained by controller 20 just prior to path computation.

Controller 20 iterates through the set of service points 210A, 210B, and 210D for the service chain, starting at service point 210A and ending at service point 210D, and computes the shortest constraint-based sub-paths between each pair of the service points in the service chain. To compute the shortest constraint-based sub-paths between a pair of service points, controller 20 may apply an algorithm represented by steps of operation 118 of FIG. 6. That is, controller 20 may use an active topology to compute a constraint-conforming end-to-end path that traverses the sub-network of the active topology between the pair of service points. The active topology may be obtained from one or more active topology servers just prior to computation, e.g., ALTO, I2RS, BGP, and other such servers that provide topology as a service to controller 20. The active topology provided to each iteration of the end-to-end path computation may be identical, at least in respect to the sub-network of the active topology between the pair of service points for the iteration.

For example, controller 20 compute at least one end-to-end network path according to techniques described herein between service point 210A and service point 210C, and controller 20 also computes at least one end-to-end network path according to techniques described herein between service point 210A and service point 210C. In this way, controller 20 iteratively applies the end-to-end network path computation operation to the pairs of service points of the service chain to determine potentially optimal sub-paths, which controller 20 may join to compute overall service path 202. The sub-paths may conform to local constraints and in some cases global constraints between the service point pairs, while overall service path 202 conforms to global constraints. As a result, the local sub-paths may produce local optimums while overall service path 202 may approach and in some cases reach a global optimum service path for the service chain.

Controller 20 may provision service path 202 by installing configuration and/or forwarding state to network devices that implement the service path 202, which in this example may include service point 210A, network device 206C, network device 206B, service point 210C, network device 206E, and service point 210D. The forwarding state directs packet flow packets along the service chain for processing according to the identified set of service points 210 for the service. Such forwarding state may specify tunnel interfaces for tunneling between service points 210 using network tunnels such as IP or Generic Route Encapsulation (GRE) tunnels, or by using VLANs, Multiprotocol Label Switching (MPLS) techniques, and so forth. In some instances, real or virtual switches the connect service points 210 may be configured to direct packet flow packets to the service points 210 according to the service chain. Controller 20 may confirm the connectivity request 218 by sending connectivity confirmation 219 to NMS 16, which may subsequently map packet flows to the service path 202.

Controller 20 of FIG. 7 may represent any of controllers 20 or 25 of FIGS. 1-4. Further example details of a software-defined networking (SDN) controller are described in PCT International Patent Application PCT/US13/44378, filed Jun. 5, 2013, the contents of which are incorporated herein by reference.

Figure 8:
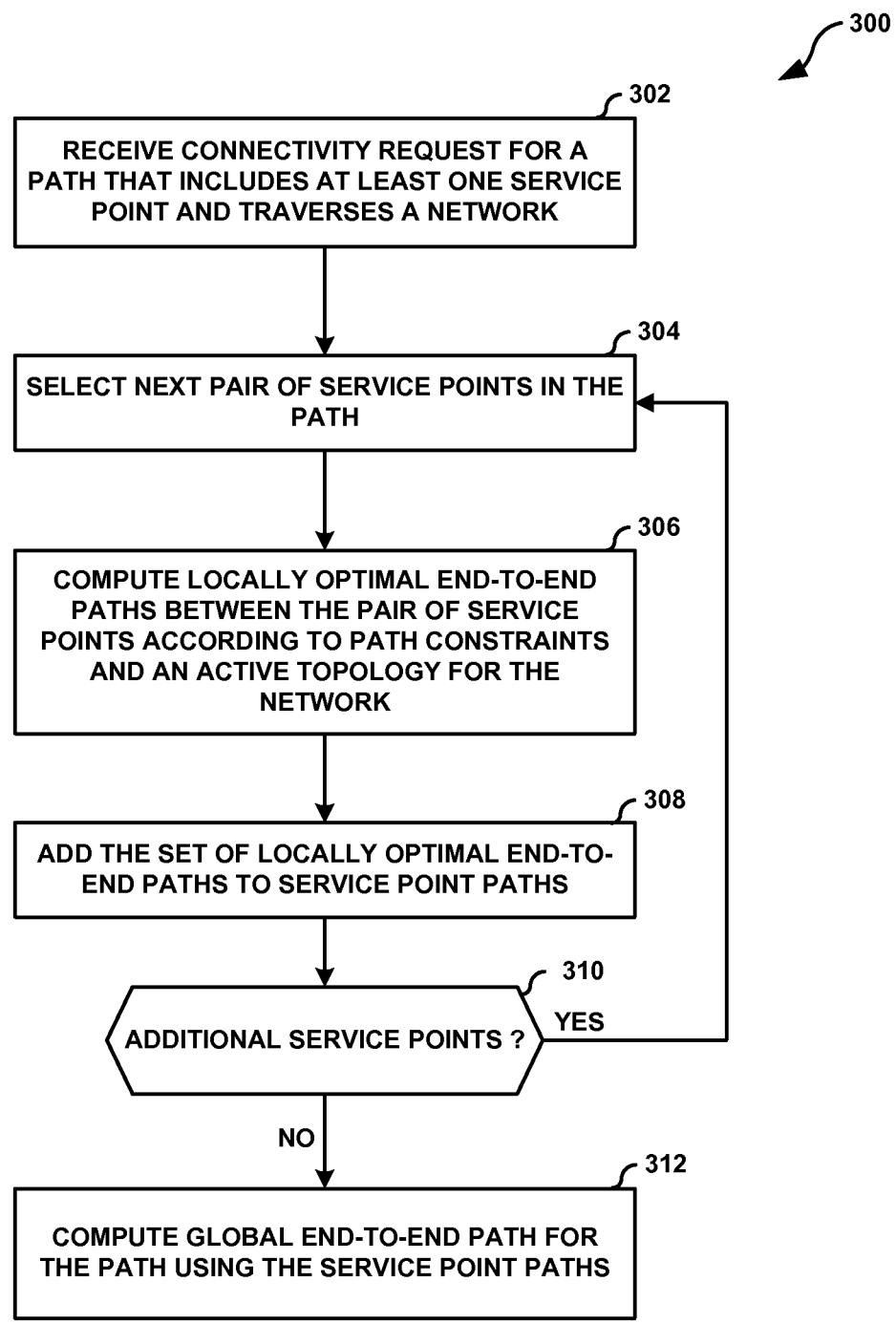
FIG. 8 is a flowchart illustrating an example operation 300 of a controller to compute an end-to-end network path that includes service points of a service chain, in accordance with techniques described herein.

FIG. 8 is a flowchart illustrating an example operation 300 of a controller to compute an end-to-end network path that includes service points of a service chain, in accordance with techniques described herein. The example operation is described with respect to controller 20 of FIG. 7.

Initially, controller 20 receives a connectivity request that requests connectivity between a service entry point and exit point for a service path that includes a set of at least one service point (302). The controller 20 selects a next pair of service points in the service path (304) and computes the one or more shortest constraint-based paths between the next pair of service points connected by an active topology and conforming to one or more local constraints (306). The following is example pseudo-code for computing the one or more shortest constraint-based paths between a pair of service points:

```
ComputeEndToEndPath(S,E,C,AT)
{
    Compute an end-to-end path between nodes S and E using AT and
    C using the Constrained SPF algorithm;
    Return the result in OptimalPathsBetweenSandE;
}
```

In some cases, S (service entry point) and E (service exit point) may be the same service point, for a service chain may consists of only a single service point. The constraints and active topology are represented by C and AT, respectively. To compute the end-to-end path, the pseudo-code may apply the mode of operation 118 illustrated and described with respect to FIG. 6, for instance.

The controller 20 adds the one or more shortest constraint-based paths to a service point paths data structure (308). If additional pairs of service points remain in the set of service points (YES branch of 310), the controller 20 selects the next pair of service points in the service path (304).

If no additional pairs of service points remain in the set of service points (NO branch of 310), the controllers 20 uses service point paths to determine a global end-to-end path that conforms to the dynamically-updated active topology and one or more global constraints for the service path (312).

The following is example pseudo-code for computing service point paths and references the ComputeEndToEndPath pseudo-code procedure provided above:

```
ComputePathsBetweenServicePoints(S, E, C, AT, SP[ ]) {
    For each service point pair (Si and Ei) in SP[ ] between S and
    E with the subset of constraints C applicable to this sub-
    chain C1 and subset of active topology AT between S1 and E1 {
    ComputeEndToEndPath (Si, Ei, Ci, AT)
        Add the result to a subset contained in ServicePointPaths
    }
    Return ServicePointPaths
}
```

Figure 9:
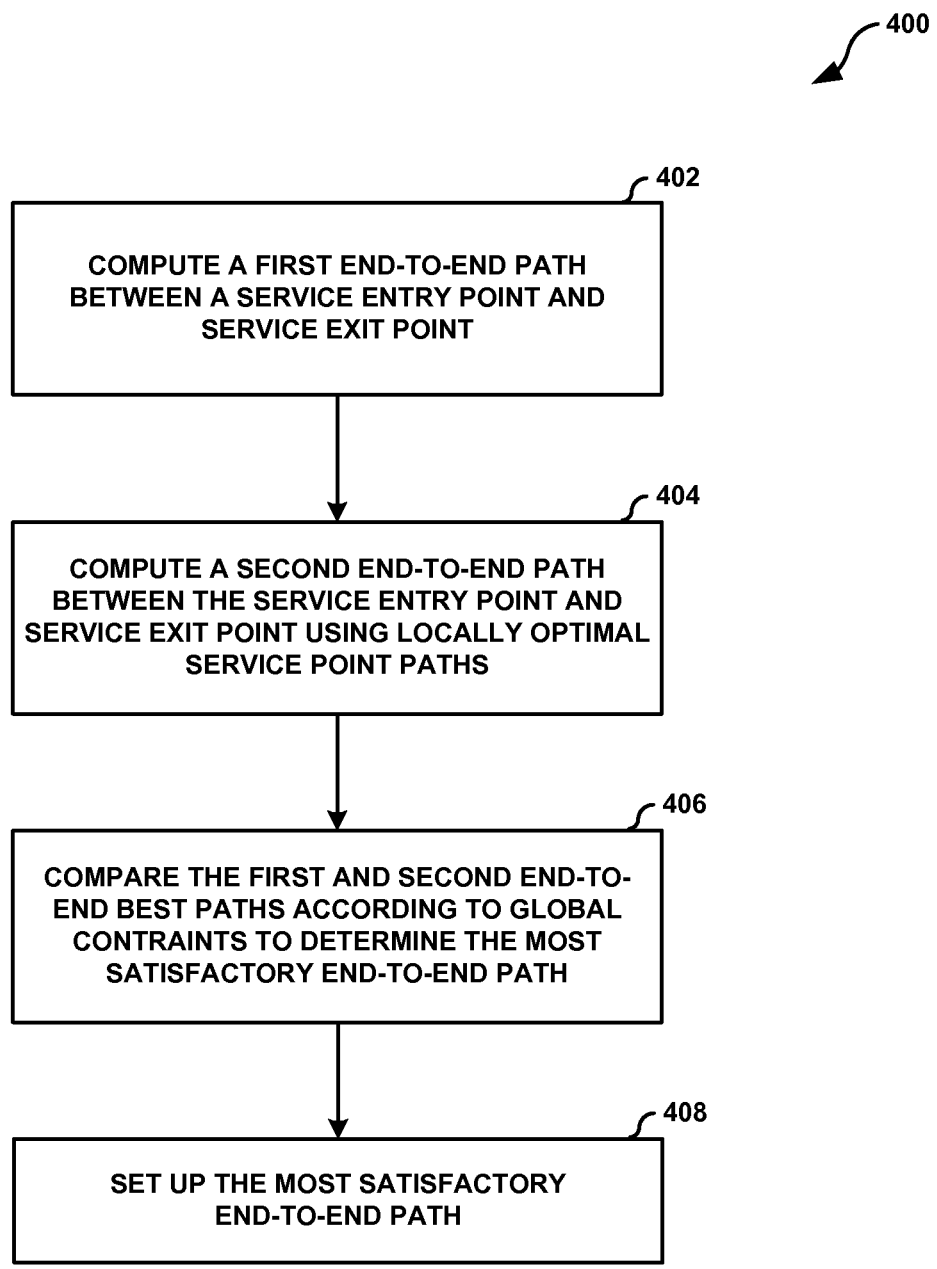
FIG. 9 is a flowchart illustrating an example operation of a controller to determine a satisfactory end-to-end network path that includes service points of a service chain, in accordance with techniques described herein.

FIG. 9 is a flowchart illustrating an example operation 400 of a controller to determine a satisfactory end-to-end network path that includes service points of a service chain, in accordance with techniques described herein. The example operation is described with respect to controller 20 of FIG. 7.

Controller 20 uses the active topology information dynamically obtained from the network 208 to compute an end-to-end path using different techniques described herein. Controller 20 computes a first end-to-end path between a service entry point and service exit point using, for instance, the dynamic end-to-end path computation and setup techniques described with respect to FIGS. 1-6 (402). In doing so, controller 20 may treat the sub-paths between service points as "loose hops" along the path, which allows computation using regular CSPF of paths using normal routing.

Controller 20 further computes a second end-to-end path between the service entry point and service exit point by computing locally optimal service point paths that are sub-paths connecting pairs of service points in order of the service chain (404). Controller 20 may apply mode of operation 300 described above with respect to FIG. 8, for instance.

To determine whether computing locally optimal service point paths results in a computed end-to-end path that better satisfies the local and global constraints, controller 20 compares the first end-to-end path and second end-to-end path according to global constraints for requested connectivity (406). Controller 20 may establish the path that best satisfies the constraints (408).

Figure 10:
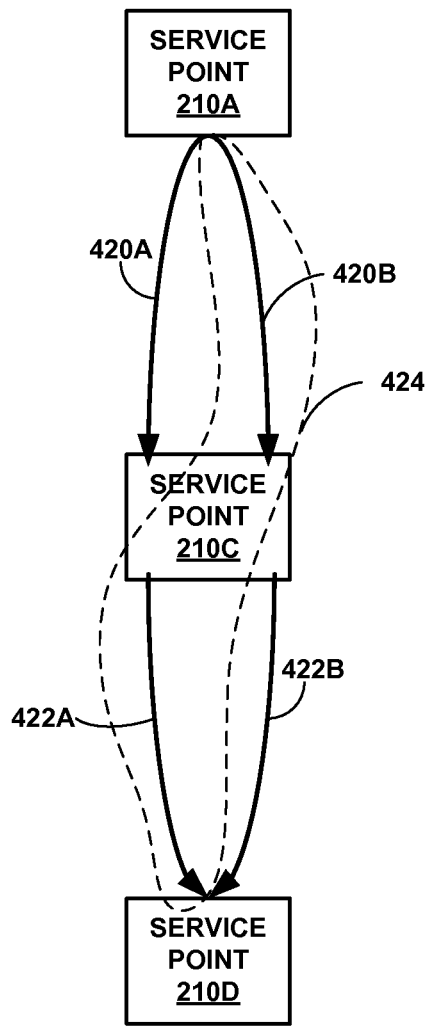
FIG. 10 is a block diagram illustrating example service point paths connecting service points for a service chain, according to techniques described in this disclosure.

FIG. 10 is a block diagram illustrating example service point paths connecting service points for a service chain, according to techniques described in this disclosure. For ease of illustration purposes, only service points 210A, 210C, and 210D from FIG. 7 that are service points of the service chain are illustrated. Controller 20 iteratively applies dynamic end-to-end path computation to the active topology in accordance with local constraints to compute multiple sub-paths for each pair of service points 210. For the illustrated service chain including service points 210A to service point 210C to service point 210D, controller 20 computes locally optimal sub-paths 420A-420B from service point 210A to service point 210C according to local constraints for the active topology connecting service points 210A, 210C and further computes locally optimal sub-paths 422A-422B from service point 210C to service point 210D according to local constraints for the active topology connecting service points 210C, 210D.

Controller 20 may store respective representations of sub-paths 420A-420B as a first set within a service point paths data structure and may further store respective representations of sub-paths 422A-422B as a second set within the service point paths data structure. Controller 20 may then walk the various combinations of sub-paths to determine the most satisfactory overall path according to local and/or global constraints. The combinations of sub-paths illustrated include {420A, 422A}, {420A, 422B}, {420B, 422A}, and {420B, 422B}. In this example, controller 20 determines an overall service path 424 including sub-paths 420B, 422A is the most satisfactory overall path according to local and/or global constraints. Accordingly, controller 20 may dynamically set up service path 424 in network 208.

In this respect, FIG. 10 illustrates an overall graph of paths, including the optimal sub-graphs (i.e., sub-paths 420A, 420B, 422A, 422B) between service points 210A, 210C, and 210D. Controller 20 computes the paths according to any inputs constraints in combination with the active topology information obtained for network 208.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various aspects of this disclosure have been described. These and other aspects are within the scope of the following claims.

What is claimed is:

1. A method comprising:
    receiving, by a controller network device of a network, a request for network connectivity between a service entry point and a service exit point for a service chain of three or more service points, each of the service points performing a respective service, to provide a composite service for application to packet flows associated to the service chain;
    receiving and storing, by the controller network device, active topology information for the network;
    for each pair of the service points in the service chain and by the controller using the active topology information, computing at least one end-to-end sub-path through a sub-network of the network, the at least one end-to-end sub-path connecting the pair of the service points according to a constraint;
    computing, by the controller network device and using the at least one end-to-end sub-path for each pair of the service points, a service path between the service entry point and the service exit point for the service chain; and
    sending, by the controller network device to at least one layer of the network, one or more messages to configure the at least one layer of the network to establish the service path between the service entry point and the service exit point for the service chain.

2. The method of claim 1,
    wherein computing the at least one end-to-end sub-path through the sub-network connecting the pair of the service points according to the constraint comprises computing the at least one end-to-end sub-path through the sub-network connecting the pair of the service points according to a local constraint applicable only to the sub-network connecting the pair of the service points.

3. The method of claim 1,
    wherein computing, by the controller network device and using the at least one end-to-end sub-path for each pair of the service points, the service path between the service entry point and the service exit point for the service chain comprises applying a global constraint applicable between the service entry point and the service exit point to determine a best service path from among the combinations of the at least one end-to-end sub-path for each pair of the service points.

4. The method of claim 1, further comprising:
    computing, by the controller network device and using the active topology information, an end-to-end path between the service entry point and the service exit point for the service chain;
    comparing, by the controller network device, the end-to-end path and the service path according to a global constraint for the request to determine whether the end-to-end path or the service path best is a most satisfactory path for the global constraint; and
    providing, by the controller network device in response to the request for network connectivity, an indication that the request for network connectivity is granted to permit use of the most satisfactory path for sending network traffic along the service chain.

5. The method of claim 1, wherein sending one or more messages to configure the at least one layer of the network comprises:
    sending, by the controller network device, one or more messages containing a first set of parameters to establish an optical transport path for the requested network connectivity;
    sending, by the controller network device, one or more messages containing a second set of parameters to establish the service path for the requested network connectivity, wherein the service path is established to send network traffic over the optical transport path, the method further comprising:
    in response to determining that both the optical transport path and the service path have been established, sending, by the controller network device, an indication that the request for network connectivity is granted to permit use of the service path and the optical transport path for sending network traffic between the service entry point and the service exit point.

6. The method of claim 5, further comprising:
    determining whether an optical transport path currently exists between one of the pair of service points,
    wherein sending the one or more messages containing the first set of parameters comprises in response to determining that the optical transport path does not currently exist between the one of the pair of service points, sending one or more messages instructing an external network device to compute and program the optical transport path based on topology information stored by the external network device.

7. The method of claim 5, further comprising:
    storing, by the controller network device, topology information for an optical network layer of the network;
    determining whether an optical transport path currently exists between one of the pair of service points; and
    in response to determining that the optical transport path does not currently exist between the one of the pair of service points, and by the controller:
        computing the optical transport path based on the topology information for the optical network layer,
        selecting the first set of parameters based on the computed optical transport path; and
        programming the computed optical transport path in accordance with the parameters.

8. The method of claim 7, wherein sending the one or more messages containing the first set of parameters to establish the optical transport path comprises sending an explicit light-path route to an ingress optical network device that specifies a sequence of optical network device hops and wavelengths for use by the ingress optical network device in setting up the optical transport path between the ingress optical network device and an egress optical network device.

9. The method of claim 5, wherein sending the one or more messages containing the second set of parameters to establish the traffic-engineered service path comprises sending an explicit route object (ERO) to an ingress network device on the service path for the ingress network device to use in setting up a path between the ingress network device and an egress network device.

10. The method of claim 1, further comprising:
storing, by the controller network device, topology information for an Internet Protocol (IP)/Multiprotocol Label Switching (MPLS) network layer;
computing the service path based on the stored topology information for the IP/MPLS network layer;
selecting the first set of parameters based on the service path; and
establishing the service path.

11. The method of claim 1,
wherein receiving the request for network connectivity comprises receiving the request from a network management system of a service provider; and
providing, by the controller network device to the network management system in response to the request for network connectivity, an indication that the request for network connectivity is granted.

12. The method of claim 1, wherein at least one service point of the one or more service points applies, to packet flows mapped to the service chain, a value-added service comprising one of a firewall service, network address translation service, media optimization service, deep packet inspection service, and load balancing service.

13. The method of claim 1, wherein the request for network connectivity specifies a list of services and an order in which to apply the services in the list of services, wherein computing the service path comprises computing the service path for the service chain to apply the services in the order specified by the request.

14. The method of claim 1, wherein the request for network connectivity specifies the three or more service points in a particular order, wherein computing the service path comprises computing the service path along the three or more service points in the particular order.

15. A controller network device comprising:
a control unit comprising a processor and configured to receive a request for network connectivity between a service entry point and a service exit point for a service chain of three or more service points that apply respective services, each of the service points performing a respective service, to provide a composite service for application to packet flows associated to the service chain,
wherein the control unit is further configured to receive and store active topology information for the network,
wherein the control unit is further configured to, for each pair of the service points in the service chain and using the active topology information, compute at least one end-to-end sub-path through a sub-network of the network, the at least one end-to-end sub-path connecting the pair of the service points according to a constraint,
wherein the control unit is further configured to compute, using the at least one end-to-end sub-path for each pair of the service points, a service path between the service entry point and the service exit point for the service chain, and
wherein the control unit is further configured to send, to at least one layer of the network, one or more messages to configure the at least one layer of the network to establish the service path between the service entry point and the service exit point for the service chain.

16. The controller network device of claim 15,
wherein to compute the at least one end-to-end sub-path through the sub-network connecting the pair of the service points according to the constraint the control unit is further configured to compute the at least one end-to-end sub-path through the sub-network connecting the pair of the service points according to a local constraint applicable only to the sub-network connecting the pair of the service points.

17. The controller network device of claim 15,
wherein to compute, using the at least one end-to-end sub-path for each pair of the service points, the service path between the service entry point and the service exit point for the service chain the control unit is further configured to apply a global constraint applicable between the service entry point and the service exit point to determine a best service path from among the combinations of the at least one end-to-end sub-path for each pair of the service points.

18. The controller network device of claim 15,
wherein the control unit is further configured to compute, using the active topology information, an end-to-end path between the service entry point and the service exit point for the service chain;
wherein the control unit is further configured to compare the end-to-end path and the service path according to a global constraint for the request to determine whether the end-to-end path or the service path best is a most satisfactory path for the global constraint, and
wherein the control unit is further configured to provide, in response to the request for network connectivity, an indication that the request for network connectivity is granted to permit use of the most satisfactory path for sending network traffic along the service chain.

19. The controller network device of claim 15,
wherein, to send one or more messages to configure the at least one layer of the network, the control unit is further configured to:
send one or more messages containing a first set of parameters to establish an optical transport path for the requested network connectivity, and
send one or more messages containing a second set of parameters to establish the service path for the requested network connectivity,
wherein the service path is established to send network traffic over the optical transport path, and
wherein the control unit is further configured to, in response to determining that both the optical transport path and the service path have been established, send an indication that the request for network connectivity is granted to permit use of the service path and the optical transport path for sending network traffic between the service entry point and the service exit point.

20. The controller network device of claim 19,
wherein the control unit is further configured to determine whether an optical transport path currently exists between one of the pair of service points,
wherein to send the one or more messages containing the first set of parameters the control unit is further configured to, in response to determining that the optical transport path does not currently exist between the one of the pair of service points, send one or more messages instructing an external network device to compute and program the optical transport path based on topology information stored by the external network device.

21. The controller network device of claim 19,
wherein the control unit is further configured to store topology information for an optical network layer of the network,
wherein the control unit is further configured to determine whether an optical transport path currently exists between one of the pair of service points,
wherein the control unit is further configured to, in response to determining that the optical transport path does not currently exist between the one of the pair of service points:
 compute the optical transport path based on the topology information for the optical network layer,
 select the first set of parameters based on the computed optical transport path; and
 program the computed optical transport path in accordance with the parameters.

22. The controller network device of claim 21, wherein to send the one or more messages containing the first set of parameters establish the optical transport path the control unit is further configured to send an explicit light-path route to an ingress optical network device that specifies a sequence of optical network device hops and wavelengths for use by the ingress optical network device in setting up the optical transport path between the ingress optical network device and an egress optical network device.

23. A non-transitory computer-readable medium comprising instructions for causing one or more programmable processors of a controller network device of a network to:
 receive a request for network connectivity between a service entry point and a service exit point for a service chain of three or more service points, each of the service points performing a respective service, to provide a composite service for application to packet flows associated to the service chain;
 receive and store active topology information for the network;
 for each pair of the service points in the service chain and using the active topology information, compute at least one end-to-end sub-path through a sub-network of the network, the at least one end-to-end sub-path connecting the pair of the service points according to a constraint;
 compute, using the at least one end-to-end sub-path for each pair of the service points, a service path between the service entry point and the service exit point for the service chain; and
 send, to at least one layer of the network, one or more messages to configure the at least one layer of the network to establish the service path between the service entry point and the service exit point for the service chain.

* * * * *